(12) United States Patent
Philipp et al.

(10) Patent No.: US 8,624,609 B2
(45) Date of Patent: *Jan. 7, 2014

(54) TWO-DIMENSIONAL POSITION SENSOR

(75) Inventors: Harald Philipp, Hamble (GB); Samuel Brunet, Southampton (GB); Luben Hristov, Sofia (BG); Esat Yilmaz, Chandler's Ford (GB); Peter Timothy Sleeman, Waterlooville (GB)

(73) Assignee: Atmel Corporation, San Jose, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 12/873,905

(22) Filed: Sep. 1, 2010

(65) Prior Publication Data

US 2010/0321043 A1 Dec. 23, 2010

Related U.S. Application Data

(63) Continuation of application No. 12/061,483, filed on Apr. 2, 2008, now Pat. No. 7,808,255.

(60) Provisional application No. 60/910,441, filed on Apr. 5, 2007.

(51) Int. Cl.
*G01R 27/26* (2006.01)

(52) U.S. Cl.
USPC ........... 324/686; 324/660; 324/662; 324/663; 345/173; 345/174

(58) Field of Classification Search
USPC ........... 324/660, 662, 663, 686; 345/173, 174
See application file for complete search history.

(56) References Cited

U.S. PATENT DOCUMENTS

| | | |
|---|---|---|
| 4,879,461 A | 11/1989 | Philipp |
| 5,730,165 A | 3/1998 | Philipp |

(Continued)

FOREIGN PATENT DOCUMENTS

| | | |
|---|---|---|
| DE | 202007005237 | 8/2007 |
| GB | 2428306 | 1/2007 |

(Continued)

OTHER PUBLICATIONS

PCT International Search Report and Opinion in corresponding PCT/GB2008/001155; mailed Jul. 21, 2008.

(Continued)

*Primary Examiner* — Arleen M Vazquez
*Assistant Examiner* — Son Le
(74) *Attorney, Agent, or Firm* — Baker Botts LLP

(57) ABSTRACT

A two-dimensional position sensor is formed by drive electrodes (52) and sense electrodes (62, 64, 66) both extending in the x-direction and interleaved in the y-direction. The sense electrodes comprise several groups, two of which co-extend in the x-direction over each different portions of extent in the x-direction. The drive and sense electrodes are additionally arranged to capacitively couple with each other. In use, drive signals are applied to the drive electrodes and then the resultant sense signals received from the sense electrodes measured. The position of a touch or stylus actuation on the sensor is determined in the x- and y-directions as follows. In the x-direction, the position is determined by an interpolation between sense signals obtained from co-extending pairs of sense electrodes, and in the y-direction by interpolation between sense signals obtained from different sequences of drive signals applied to the drive electrodes.

20 Claims, 20 Drawing Sheets

(56) References Cited

U.S. PATENT DOCUMENTS

| | | |
|---|---|---|
| 6,288,707 B1 | 9/2001 | Philipp |
| 6,452,514 B1 * | 9/2002 | Philipp .......................... 341/33 |
| 6,730,863 B1 | 5/2004 | Gerpheide |
| 7,148,704 B2 | 12/2006 | Philipp |
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 2007/0062739 A1 | 3/2007 | Philipp |
| 2007/0279395 A1 | 12/2007 | Philipp |
| 2008/0007539 A1 * | 1/2008 | Hotelling ..................... 345/173 |
| 2008/0246496 A1 | 10/2008 | Hristov et al. |
| 2008/0309635 A1 | 12/2008 | Matsuo |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

FOREIGN PATENT DOCUMENTS

| | | |
|---|---|---|
| GB | 2439614 | 1/2008 |
| WO | 2008122759 | 10/2008 |
| WO | WO 2012/129247 A2 | 9/2012 |

OTHER PUBLICATIONS

UK Intellectual Property Office, "Combined Search and Examination Report under Sections 17 and 18(3)" in corresponding application GB0806001.4: mailed Aug. 4, 2008.

Entire USPTO Prosecution History of Bennett et al., U.S. Appl. No. 12/061,483, filed Apr. 2, 2008, entitled Two-Dimensional Position Sensor.

Third Office Action of China State Intellectual Property Office (Translation) for Chinese Application No. 2008/80011275.8, Dec. 4, 2012.

Office Action and English translation for Chinese Patent Application 20880011275.8, Aug. 25, 2011.

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

TWO-DIMENSIONAL POSITION SENSOR

RELATED APPLICATIONS

This application is a continuation of U.S. application Ser. No. 12/061,483 filed Apr. 2, 2008, which claims priority from U.S. Provisional Patent Application No. 60/910,441 filed on Apr. 5, 2007, the entire contents of which is hereby incorporated by reference.

BACKGROUND OF THE INVENTION

The invention relates to 2-dimensional position sensors. More particularly the invention relates to 2-dimensional position sensors of the type based on capacitive proximity sensing techniques. Such sensors may be referred to as 2-dimensional capacitive transducing (2DCT) sensors. 2DCT sensors are based on detecting a disturbance in a capacitive coupling of sensor electrodes, either to ground or to another electrode, caused by the proximity of a pointing object. A measured location for the disturbance corresponds to a measured position for the pointing object.

2DCT sensors are typically actuated by a human finger, or a stylus. Example devices include touch screen and touch sensitive keyboards/keypads, e.g. as used for controlling consumer electronic devices/domestic appliances, and possibly in conjunction with an underlying display, such as a liquid crystal display (LCD), or cathode ray tube (CRT). Other devices which may incorporate 2DCT sensors include pen-input tablets and encoders used in machinery for feedback control purposes, for example. 2DCT sensors are capable of reporting at least a 2-dimensional coordinate, Cartesian or otherwise, related to the location of an object or human body part, by means of a capacitance sensing mechanism.

Devices employing 2DCT sensors have become increasingly popular and common, not only in conjunction with personal computers, but also in all manner of other appliances such as personal digital assistants (PDAs), point of sale (POS) terminals, electronic information and ticketing kiosks, kitchen appliances and the like. 2DCT sensors are frequently preferred to mechanical switches for a number of reasons. For example, 2DCT sensors require no moving parts and so are less prone to wear than their mechanical counterparts. 2DCT sensors can also be made in relatively small sizes so that correspondingly small, and tightly packed keypad arrays can be provided. Furthermore, 2DCT sensors can be provided beneath an environmentally sealed outer surface/cover panel. This makes their use in wet environments, or where there is a danger of dirt or fluids entering a device being controlled attractive. Furthermore still, manufacturers often prefer to employ interfaces based on 2DCT sensors in their products because such interfaces are often considered by consumers to be more aesthetically pleasing than conventional mechanical input mechanisms (e.g. push-buttons).

U.S. Pat. No. 5,730,165 describes a capacitive sensing device which relies on measuring the capacitance of a sensing electrode to a system reference potential (earth). The principles described in U.S. Pat. No. 5,730,165 utilize passive capacitive sensing techniques. The contents of U.S. Pat. No. 5,730,165 are incorporated herein in their entirety by reference as background material to the invention. In broad summary, passive capacitive sensors employ sensing electrodes coupled to capacitance measurement circuits. Each capacitance measurement circuit measures the capacitance (capacitive coupling) of its associated sensing electrode to a system ground. When there is no pointing object near to the sensing electrode, the measured capacitance has a background/quiescent value. This value depends on the geometry and layout of the sensing electrode and the connection leads to it, and so on, as well as the nature and location of neighbouring objects, e.g. the sensing electrodes proximity to nearby ground planes. When a pointing object, e.g. a user's finger, approaches the sensing electrode, the pointing object appears a virtual ground. This serves to increase the measured capacitance of the sensing electrode to ground. Thus an increase in measured capacitance is taken to indicate the presence of a pointing object.

U.S. Pat. No. 5,730,165 are primarily directed to discrete (single button) measurements, and not to 2D position sensor applications. However the principles described in U.S. Pat. No. 5,730,165 are readily applicable to 2DCT sensors, e.g. by providing electrodes to define either a 2D array of discrete sensing areas, or rows and columns of electrodes in a matrix configuration.

U.S. Provisional Patent Application 60/803,510, subsequently filed as U.S. Regular patent application Ser. No. 11/752,615 which published as US2006/0279395 on 6 Dec. 2007, describes a 2DCT sensor comprising a substrate with a sensitive area defined by a pattern of electrodes in which the electrodes are sensed by passive sensing techniques. A capacitance measurement circuit of the type described in U.S. Pat. No. 6,288,707, as shown in FIG. 5 of U.S. application 60/803,510, is coupled to the sensing electrodes for determining a change in capacitance caused by the approach of a user's finger or other object to the sensing electrodes. Further details of sensor circuitry and methods of driving the sensor circuitry are available in U.S. Pat. No. 5,730,165 and U.S. Pat. No. 7,148,704. It has been found that there are some limitations associated with 2DCT sensors which operate on passive sensing techniques. For example, passive 2DCT sensors are strongly sensitive to external ground loading. That is to say, the sensitivity of such sensors can be significantly reduced by the presence of nearby low impedance connections to ground which can limit their applicability. For example, some types of display screen technology provide for a low-impedance coupling to ground across the visible screen. This means a passive 2DCT overlaying the display screen will often underperform because the relatively strong coupling to ground through the screen itself reduces the sensitivity of the 2DCT to any additional coupling to ground caused by an approaching pointing object. A similar effect means 2DCT sensors can be relatively sensitive to changes in their environment e.g., a 2DCT sensor might behave differently according to its location because of differences in capacitive coupling (ground loading) to external objects. 2DCT sensors are also relatively sensitive to environmental conditions, such as temperature, humidity, accumulated dirt and spilt fluids, etc. All of these effect the sensor's reliability and sensitivity. Furthermore, the measurement circuitry associated with passive 2DCT sensing is generally of high input impedance. This makes passive sensors prone to electrical noise pick up, e.g. radio frequency (RF) noise. This can reduce reliability/sensitivity of the sensor and also places constraints on sensor design (e.g. there is limited freedom to use relatively long connection leads/traces between the sensing electrodes and associated circuitry.

Thus, there is a need to develop an improved 2DCT sensor which addresses the above-mentioned problems of certain known 2DCT sensors and particularly those 2DCT sensors which rely on passive capacitive sensing techniques as described in U.S. application 60/803,510.

SUMMARY OF THE INVENTION

According to a first aspect of the invention, there is provided a two-dimensional position sensor comprising a substrate with a sensitive area defined by a pattern of electrodes, the pattern of electrodes including drive electrodes and sense electrodes generally extending in a first direction (hereinafter, the x-direction) and interleaved in a second direction (hereinafter, the y-direction, where the x- and y-directions can be oriented along any axis of actuation, but are generally orthogonally oriented towards each other), wherein the sense electrodes comprise first, second and third groups of elements shaped such that adjacent ones of the elements of the first and second groups co-extend in the x-direction over a portion of the sensitive area and adjacent ones of the elements of the second and third groups co-extend in the x-direction over another portion, and wherein the drive electrodes are arranged to capacitively couple with the sense electrodes.

The 2DCT sensor of the invention uses active capacitive sensing. Active 2DCT sensors have been found to be less prone to the above-mentioned effects associated with passive 2DCT sensors. The active 2DCT sensor of the invention is based on measuring capacitive coupling between two electrodes rather than between a single sensing electrode and a system ground. The principles underlying active capacitive sensing techniques are described in U.S. Pat. No. 6,452,514, the contents of which are incorporated herein by reference. In an active-type sensor, one electrode, the so-called drive electrode, is supplied with an oscillating drive signal. The degree of capacitive coupling of the drive signal to the sense electrode(s) is determined by measuring the amount of charge transferred to the sense electrode by the oscillating drive signal. The amount of charge transferred, i.e. the strength of the signal seen at the sense electrode, is a measure of the capacitive coupling between the electrodes. When there is no pointing object near to the electrodes, the measured signal on the sense electrode has a background/quiescent value. However, when a pointing object, e.g. a user's finger, approaches the electrodes (or more particularly approaches near to the region separating the electrodes), the pointing object acts as a virtual ground and sinks some of the drive signal (charge) from the drive electrode. This acts to reduce the strength of the component of the drive signal coupled to the sense electrode. Thus a decrease in measured signal on the sense electrode is taken to indicate the presence of a pointing object.

An active sensor described in U.S. Pat. No. 6,452,514 comprises drive electrodes extending in rows on one side of a substrate and sense electrodes extending in columns on the other side of the substrate so as to define an array of N by M touch keys. Each key corresponds to an intersection between a drive electrode and a sense electrode. Thus the array of keys described in U.S. Pat. No. 6,452,514 may be termed a matrixed array with a single drive electrode associated with keys in a given row and a single sense electrode associated with keys in a given column. This reduces the number of drive and sense channels required, since a single drive channel simultaneously drives all of the keys in a given row and a single sense channel senses all of the keys in a given column. The capacitive coupling between the electrodes at the positions of the different keys can be determined by driving the appropriate row and sensing the appropriate column. For example, to determine the capacitive coupling between the electrodes associated with a key at the intersection of row 2 and column 3, the drive signal is applied to the drive electrode of row 2 while the sense channel associated with the sense electrode of column 3 is active. The output from the active sense channel reflects the capacitive coupling between the electrodes associated with the key under investigation. Different keys can be scanned by sequencing through different combinations of drive and sense channels. In one mode the drive electrodes may be driven sequentially while the sense electrodes are all continuously monitored. A signal change on one (or more) of the sense electrodes indicates the presence of a pointing object. The sense electrode on which the change is seen defines position in one dimension, the drive electrode being driven when the change was seen defines position in the other dimension.

When implementing drive and sense channel circuitry of the kind described in U.S. Pat. No. 6,452,514 in an integrated circuit (IC) chip package, each drive channel requires one pin-out while each sense channel requires two pin-outs. Thus, for a 2DCT sensor according to the invention comprising an array of n×m sensing areas, a matrixed array requires N+2M pin-outs (or M+2N pin-outs depending on which of the rows and columns are drive or sense electrodes). However, a discrete (non-matrixed array) requires 3NM pin-outs. Circuit connections, and in particular pin-outs in IC chip implementations, are expensive, both in monetary terms, and in terms of the physical space and complexity required to implement them. Advantageously, the 2DCT sensor of the invention requires only one pin-out for each drive channel and two pin-outs for each sense channel.

The sensor may preferably further comprise a controller comprising a drive unit for applying drive signals to the drive (D) electrodes, and a sense unit for measuring sense signals received from the sense (S) electrodes representing a degree of coupling of the drive signals between the drive electrodes and the sense electrodes. Since sense channels are generally more expensive to implement that drive channels, a cheaper sensor in accordance with the invention can be provided which may employ a controller implemented in an integrated chip requiring fewer pin-outs than known matrixed passive capacitive position sensors.

The controller may preferably further comprise a processing unit for calculating a position for an interacting object from an analysis of the sense signals obtained by applying drive signals to the drive electrodes. The position determination in each axis may include interpolating so that position can be determined. Namely, the processing unit is preferably operable to determine position in the x-direction by an interpolation between sense signals obtained from co-extending pairs of groups of sense electrodes, and position in the y-direction by an interpolation between sense signals obtained from different sequences of drive signals applied to the drive electrodes.

The electrodes can be made of a transparent material, such as indium tin oxide (ITO), Orgacon™ or any other suitable material. The substrate can also be made of a transparent material, such as glass or a transparent plastics material, e.g. a polymethyl methacrylate (PMMA) such as Perspex, Polyethylene Terephthalate (PET), a polycarbonate (PC) such as Lexan™, or a cycloolefin copolymer (COP) such as Zeonor™ or Topas™. However, in some applications, it may be the case that the electrodes and/or the substrate are opaque e.g. metal electrodes on opaque plastic, to create a mouse pad or track pad for example.

The groups of sense electrodes which co-extend can have complementary tapers over their distance of co-extension to provide ratiometric capacitive signals. Alternatively, the elements of respective groups of sense electrodes which co-extend have adjacent blocks of varying area over their distance of co-extension to provide ratiometric capacitive signals. The sense electrodes may be structured in a variety of topographical forms in order to provide the co-extension. For example, the drive and sense electrodes may interdigitate in order to provide said capacitive coupling. Over the sensitive area, the drive and sense electrodes are advantageously formed of conductive material which does not exceed a feature width substantially smaller than a characteristic spacing in the y-direction between adjacent rows of drive electrodes, such as 2, 3, 4, 5, 6, 7, 8, 9 or 10 times smaller. This keeps the amount of conductive material low while providing a large amount of capacitive coupling, which has benefits for noise reduction and signal strength.

In preferred embodiments, the elements of at least one of the first and third groups of sense electrodes form two sections separated in the y-direction by a channel, and wherein the elements of the second group of sense electrodes are externally connected to the sense unit through conductive traces that pass through the channels to a side of the sensitive area. This type of arrangement, which can also be applied to further groups of sense electrodes if provided, ensures that the conductive traces leading to inner ones of the sense electrode groups do not pass between paired drive and sense electrodes of peripheral ones of the sense electrode groups. The reduction in their capacitive coupling that would otherwise occur is thus avoided.

If there are at least three groups of sense electrodes externally connected to the sense unit through one side of the sensitive area, referred to as peripheral, intermediate and inner sense electrodes, it is advantageous if the elements of the inner sense electrodes are externally connected to the sense unit through conductive traces which become progressively wider in the y-direction from said one side towards the elements of the inner sense electrodes. This reduces the resistance of the path to the inner sense electrode groups and avoids reduction in sensitivity for such groups. For example, the elements of the peripheral and intermediate sense electrodes can form two sections separated in the y-direction, wherein the two sections of each element of the intermediate sense electrodes are externally connected to the sense unit through respective conductive traces that pass between the two sections of the peripheral sense electrodes to said one side of the sensitive area and leave a channel therebetween, and wherein the elements of the inner sense electrodes are externally connected to the sense unit through conductive traces that pass through the channel formed between the sections of the peripheral and intermediate sense electrodes.

It can also be advantageous if the elements of at least one of the groups of sense electrodes are hollow in the plane of the sensitive area. This is one way of reducing conductive material which does not contribute significantly to capacitive coupling with the drive electrodes. Other measures are also possible, such as through interdigitation and use of line-based electrode forms having a small feature width as referred to above.

It will be understood that the position of an object is defined by an appropriate coordinate system, most commonly an xy Cartesian system in which they are orthogonal, although they may be at a non-orthogonal angle. Moreover, in the following there is reference to x- or horizontal and y- and vertical respectively for convenience, although this implies no particular alignment to real space, such as relative to the direction of gravity.

According to a second aspect of the invention there is provided a control panel incorporating a two-dimensional position sensor according to the first aspect of the invention.

According to a third aspect of the invention there is provided an apparatus having a control panel incorporating a two-dimensional position sensor according to the first aspect of the invention.

According to a fourth aspect of the invention there is provided a method of sensing position of an actuation on a sensitive area of a two-dimensional position sensor, the sensitive area being defined by a pattern of electrodes including drive electrodes and sense electrodes, both generally extending in a first direction, hereinafter the x-direction, and interleaved in a second direction, hereinafter the y-direction, wherein the sense electrodes comprise first, second and third groups of elements shaped such that adjacent ones of the elements of the first and second groups co-extend in the x-direction over a portion of the sensitive area and adjacent ones of the elements of the second and third groups co-extend in the x-direction over another portion, and wherein the drive electrodes are arranged to capacitively couple with the sense electrodes, the method comprising: applying drive signals to the drive electrodes; measuring sense signals received from each group of the sense electrodes representing a degree of capacitive coupling of the drive signals between the drive electrodes and each group of the sense electrodes; determining position in the x-direction by an interpolation between sense signals obtained from co-extending pairs of groups of sense electrodes; and determining position in the y-direction by an interpolation between sense signals obtained from different sequences of drive signals applied to the drive electrodes.

BRIEF DESCRIPTION OF THE DRAWINGS

For a better understanding of the invention and to show how the same may be carried into effect reference is now made by way of example to the accompanying drawings.

FIGS. 15-18 show still further sensors embodying the invention.

FIG. 17 shows a still further sensor embodying the invention.

FIG. 18 shows a still further sensor embodying the invention.

DETAILED DESCRIPTION

Figure 1:
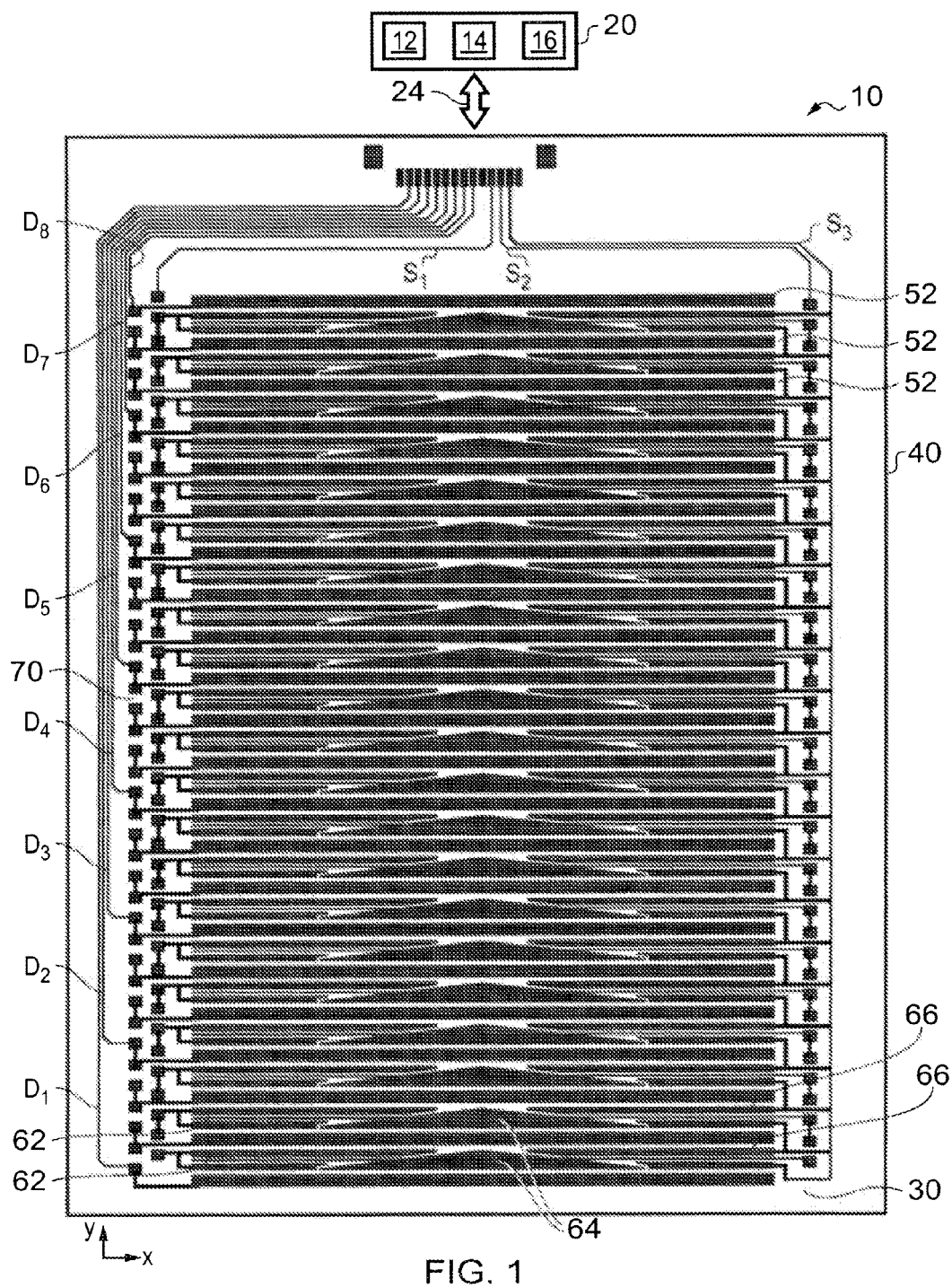
FIG. 1 is a view of a front side of a position sensor according to an embodiment of the invention.

FIG. 1 is a view of a front side of a position sensor 10 according to an embodiment of the invention. The front side of the position sensor is typically the side facing the user during normal use of the sensor or an apparatus incorporating the sensor. The sensor 10 comprises a substrate 40 bearing an electrode pattern 30 defining a sensitive area of the sensor and a controller 20. The controller 20 is coupled to electrodes within the electrode pattern by a connection 24. The electrode pattern is on one side of the substrate, typically on the opposite side of the substrate from the side facing the user during normal use.

The electrode pattern 30 on the substrate 40 can be provided using conventional techniques (e.g. lithography, deposition, or etch or deactivation techniques). The substrate is of a dielectric material such as a plastics film, in this case Polyethylene Terephthalate (PET). The electrodes comprising the electrode pattern are of a transparent conductive material, in this case Indium Tin Oxide (ITO). Alternatively, the electrodes could be formed from an opaque conductive material such as metal e.g. copper. The substrate may be bonded to an overlying panel (not shown) using a suitable pressure sensitive adhesive (PSA) which can be clear to allow light transmission. Thus the sensitive area of the sensor as a whole is transparent. If transparent, the sensor layer may be used over an underlying display without obscuration. In other embodiments, if the sensor layer is opaque, it may comprise a conventional printed circuit board or other substrate with a copper electrode pattern, e.g. for use in a mobile telephone keypad.

The controller 20 provides the functionality of a drive unit 12 for supplying drive signals to portions of the electrode pattern 30, a sense unit 14 for sensing signals from other portions of the electrode pattern 30, and a processing unit 16 for calculating a position based on the different sense signals seen for drive signals applied to different portions of the electrode pattern. The controller 20 thus controls the operation of the drive and sense units, and the processing of responses from the sense unit 14 in the processing unit 16, in order to determine the position of an object, e.g. a finger or stylus, adjacent the sensor 10. The drive unit 12, sense unit 14 and processing unit 16 are shown schematically in FIG. 1 as separate elements within the controller. However, in general the functionality of all these elements will be provided by a single integrated circuit chip, for example a suitably programmed general purpose microprocessor, or field programmable gate array, or an application specific integrated circuit.

Referring to FIG. 1, the electrodes 52 are drive (D) electrodes represented by longitudinal bars extending in the x-direction. Adjacent drive electrodes 52 are spaced apart by three groups 62, 64, 66 of sense (S) electrodes.

Figure 1A:
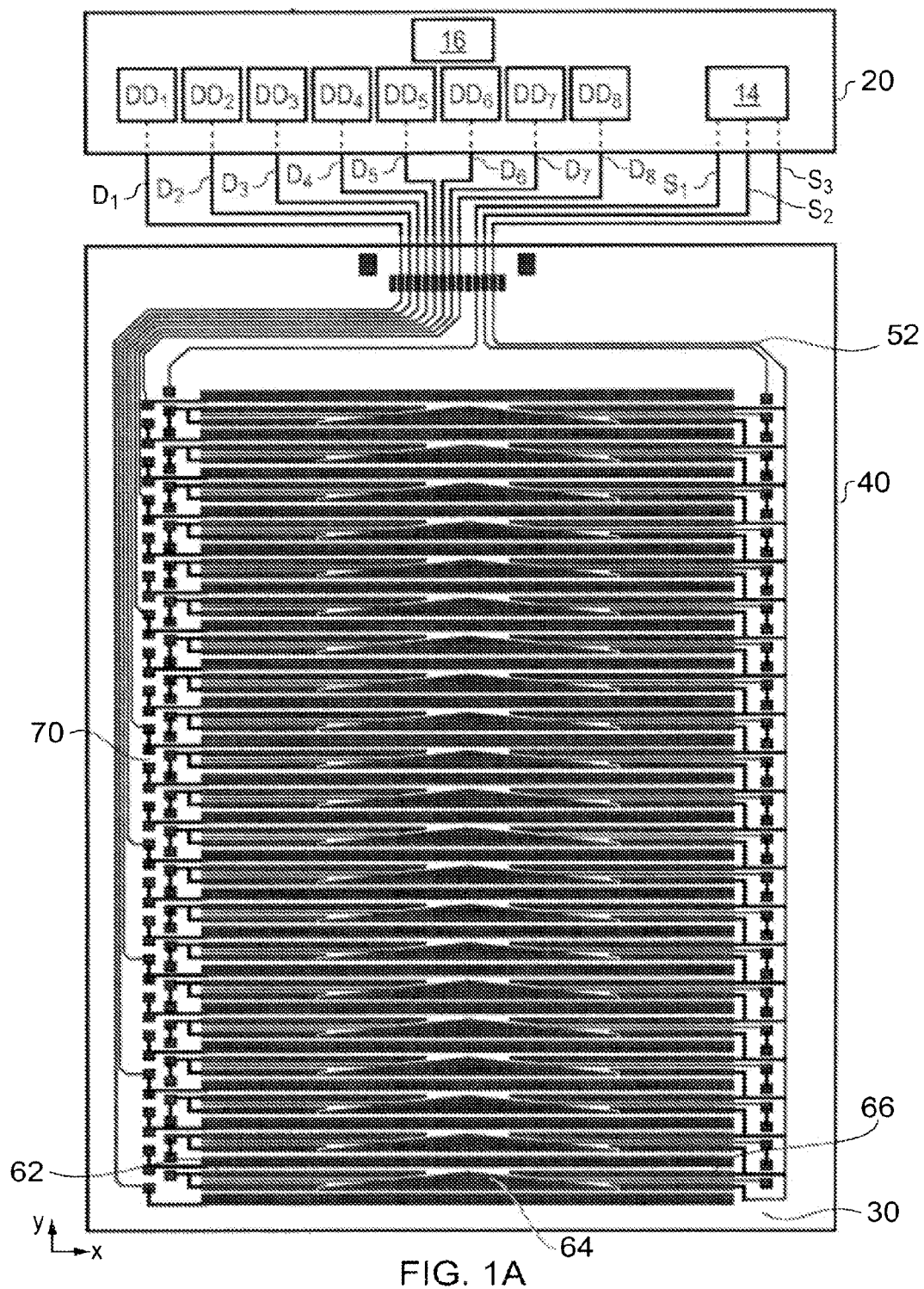
FIG. 1A shows how the drive electrodes of FIG. 1 are coupled via drive channels to drive units within the main drive unit of the controller of the sensor.

FIG. 1A shows how the drive electrodes 52 are coupled via drive channels $D_1, D_2, D_3, D_4, D_5, D_6, D_7, D_8$ to respective drive units $DD_1, DD_2, DD_3, DD_4, DD_5, DD_6, DD_7, DD_8$ within the main drive unit of the controller 20 of the sensor. In this example, a separate drive unit is provided for each drive channel, although a single drive unit with appropriate multiplexing may also be used. Each drive channel supplies drive signals to a group of three drive electrodes 52, except for either $D_1$ or $D_8$ which supplies one drive electrode. The drive electrodes 52 are each connected to each other by a chain or row of resistors 70. Alternatively, a single resistive strip could be used. The drive channels are controlled by the controller 20 to apply drive signals to the respective electrodes. The three groups of sense electrodes 62, 64, 66 are each respectively coupled via a sense or receive channels $S_1, S_2, S_3$ to the sense unit 14 of the controller 20, as shown in FIG. 1A. The sense channels are also controlled by the controller 20 to receive signals from the respective sense electrodes.

Figure 1B:
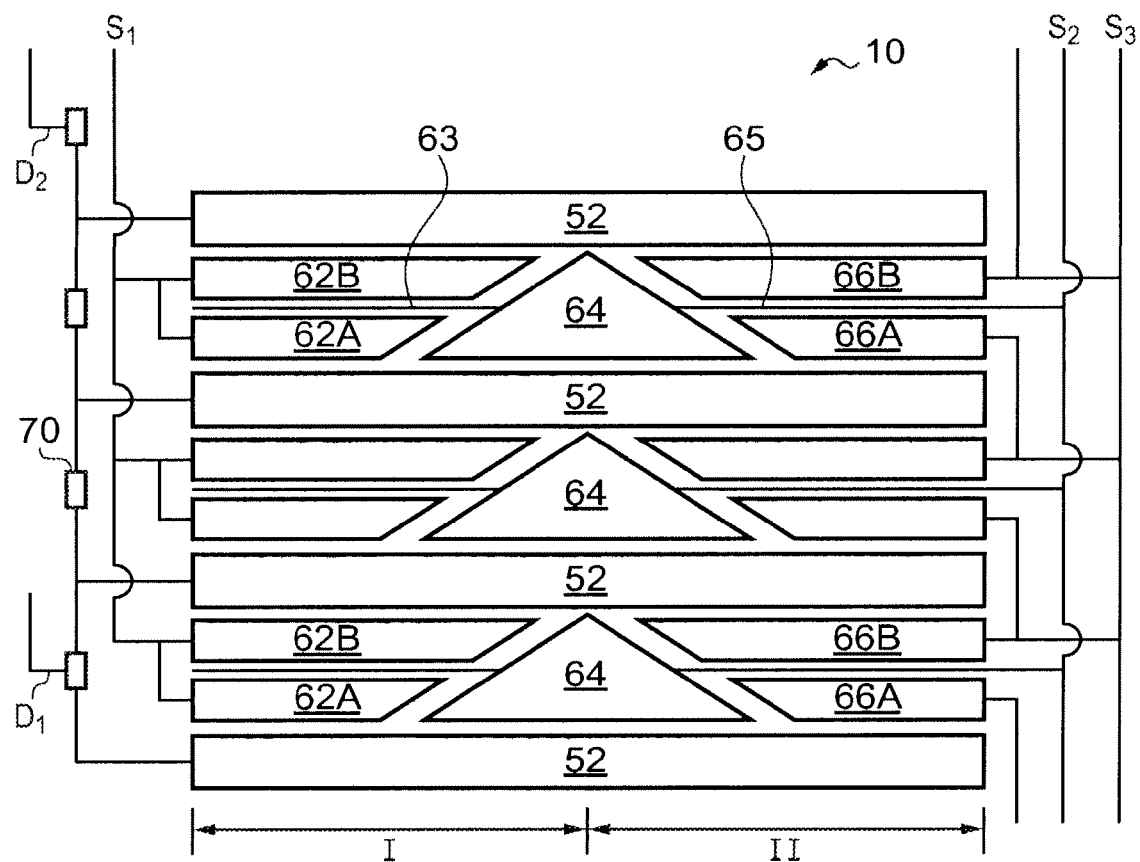
FIG. 1B is a schematic exploded view of a part of the electrode pattern of FIG. 1.
Figure 18:
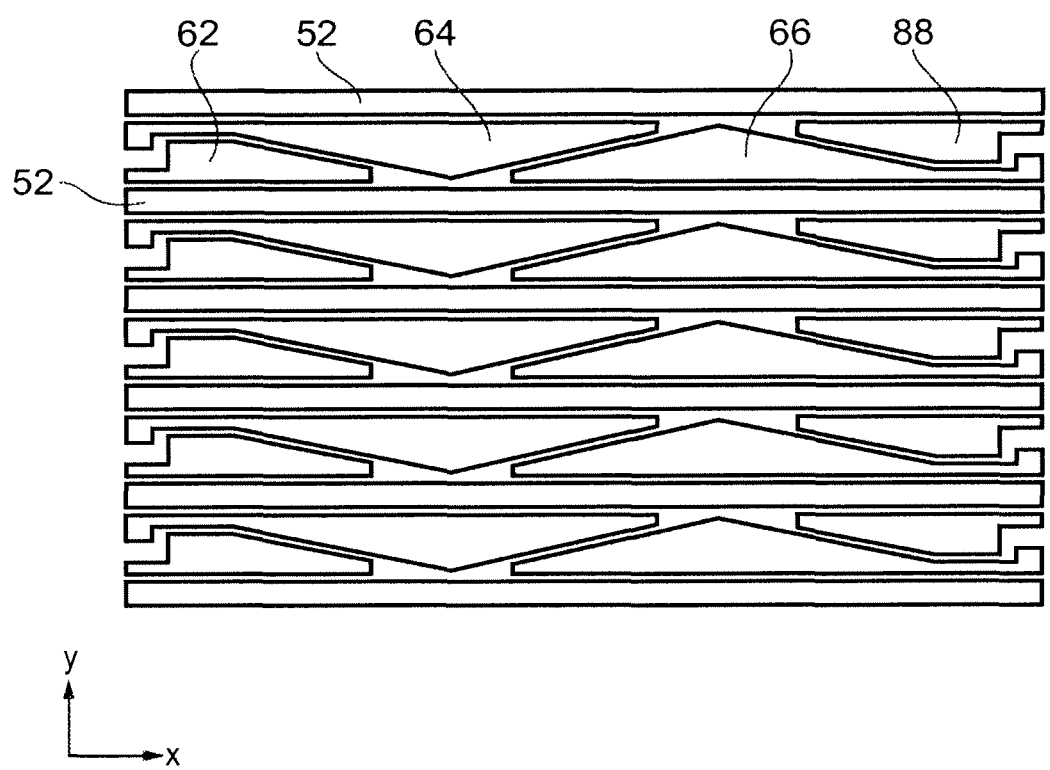

FIG. 1B is a schematic exploded view of a part of the electrode pattern of FIG. 1. It is noted that each central sense electrode 64 is connected to the external circuit connection $S_2$ via a conductive trace or feed-through 65 that divides the adjacent side sense electrode 66 into two portions 66A and 66B separated by a channel. This arrangement is advantageous compared to the alternative arrangements such as shown in FIG. 18 below, which reproduces FIG. 11 of co-pending U.S. Patent Application 60/803,510, since it avoids the feed-through to the central electrode passing between the side sense electrode and one of the adjacent drive electrodes, which in designs of the type shown in FIG. 11 has the effect or reducing the interaction between the drive electrode and the affected sense electrode. Feed-through connections to one or more groups of sense electrodes are thus arranged to subdivide another group of sense electrodes to avoid the feed-through connections lying directly adjacent to any of the drive electrodes. This approach can be used in a wide variety of electrode patterns so that feed-through connections to one group of sense electrodes do not pass between drive electrodes and another group of sense electrodes with which the drive electrode is paired.

As shown in FIGS. 1, 1A and 1B, the sense electrodes are classified into three groups. A first group of tapered electrodes 62 is arranged at the left hand side of the sensitive area of the electrode pattern. The tapered electrodes 62 are cut into two sections 62A and 62B defining a channel therebetween. A second group of triangular electrodes 64 with double tapers is arranged so that the electrodes extend inwards from then left and right hand sides respectively of the sensitive area towards the centre. A third group of tapered electrodes 66 is arranged at the right hand side of the sensitive area of the electrode pattern. The tapered electrodes 66 are cut in two sections 66A and 66B defining a channel therebetween. The first and second groups of electrodes co-extend over a portion of the extent in the x-direction, labelled region I in FIG. 1B, and the second and third groups co-extend over region II. The different regions provide ratiometric capacitive signals indicative of capacitive coupling of a user's finger on a part of the sensor where sense electrodes are present. Advantageously, a user's finger approaching the sensor is sensed by two different electrode groups to provide a beneficial mixing of signals and hence determine the x-position of a finger or other object on the sensor. As previously mentioned, the first and third groups of sense electrodes are cut respectively into two sections to define channels therebetween. The channel between left hand side electrodes 62A and 62B has a conductive trace 63 from second group electrode 64 passing therethrough which terminates near to the left hand side perimeter of the sensitive area. The conductive traces 63 have no function other than to provide symmetry with the conductive traces 65 which serve as feed-throughs to the sense channels. Namely, each channel between the right hand side electrodes 66A and 66B allows a conductive trace 65 from the second group 64 to pass therethrough and couple to sense channel $S_2$.

As shown in FIG. 1B, each drive bar electrode 52 is connected to its vertically adjacent bar or bars by an electrically conductive line with a discrete resistor 70 in series with it. The drive electrodes are externally connected via conductive traces to drive channels $D_1$-$D_8$ from respective drive unit(s) in the controller. In FIGS. 1, 1A, 1B, the drive channels $D_1$-$D_8$ are shown connected to every third drive electrode, i.e. each drive channel drives a group of three electrodes 52.

The sensor 10 of the invention therefore comprises a plurality of driven electrodes and a plurality of sense electrodes comprising a network of interconnected electrodes across the sensitive area of the senor. Each neighbouring pairing of a drive element and a sense element may be considered to correspond to a discrete sensor area which may be operated according to the techniques described in U.S. Pat. No. 6,452,514. In use, the position of an object is determined in a measurement acquisition cycle in which the bar electrodes 52 are sequentially driven by respective drive channels and the amount of charge transferred to the sense electrodes from each bar electrode is determined by the sense channels.

Figure 1C:
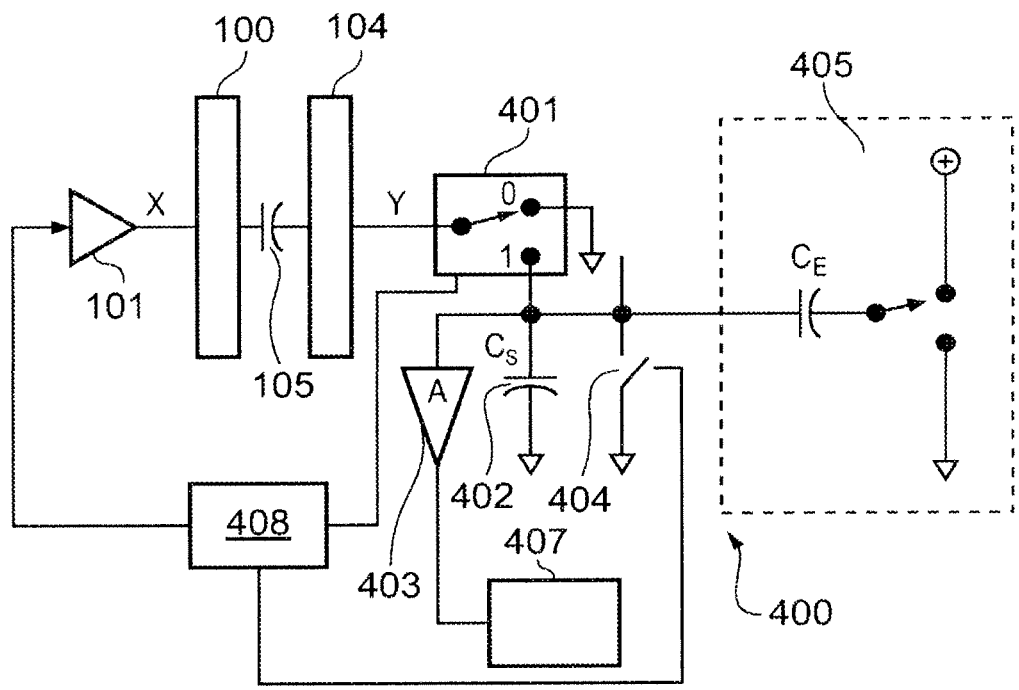
FIG. 1C schematically shows a circuit which may be used to measure the charge transferred from a driven one of the drive electrodes to the sense electrodes.

FIG. 1C schematically shows a circuit which may be used to measure the charge transferred from a driven one of the drive electrodes to the sense electrodes, the drive electrode being driven at a given time and the sense electrode have a self capacitance. This is determined primarily by their geometries, particularly in the regions where they are at their closest. Thus the driven drive electrode is schematically shown as a first plate 100 of a capacitor 105 and the sense electrode is schematically shown as a second plate 104 of the capacitor 105. Circuitry of the type shown in FIG. 1C is more fully described in U.S. Pat. No. 6,452,514. The circuit is based in part on the charge-transfer ("QT") apparatus and methods disclosed in U.S. Pat. No. 5,730,165, the contents of which are, as noted above, herein incorporated by reference.

The drive channel associated with the presently driven electrode 100, the sense channel associated with sense electrode 104 and elements of the sensor controller are shown as combined processing circuitry 400 in FIG. 1C. The processing circuitry 400 comprises a sampling switch 401, a charge integrator 402 (shown here as a simple capacitor), an amplifier 403 and a reset switch 404, and may also comprise optional charge cancellation means 405.

Figure 1D:
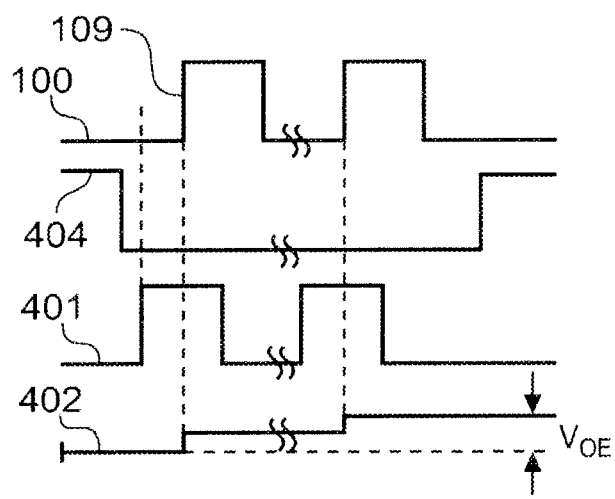
FIG. 1D shows schematically the timing relationships of operation of the circuit of FIG. 1C.

FIG. 1D shows schematically the timing relationships between the driven electrode drive signal from the drive channel 101 and the sample timing of switch 401. The drive channel 101 and the sampling switch 401 are provided with a suitable synchronizing means, which may be a microprocessor or other digital controller 408, to maintain this relationship. In the implementation shown, the reset switch 404 is initially closed in order to reset the charge integrator 402 to a known initial state (e.g., zero volts). The reset switch 404 is then opened, and at some time thereafter the sampling switch 401 is connected to charge integrator 402 via terminal 1 of the switch for an interval during which the drive channel 101 emits a positive transition, and thereafter reconnects to terminal 0, which is an electrical ground or other suitable reference potential. The drive channel 101 then returns to ground, and the process repeats again for a total of 'n' cycles, (where n may be 1 (i.e. 0 repeats), 2 (1 repeat), 3 (2 repeats) and so on). It can be helpful if the drive signal does not return to ground before the charge integrator is disconnected from the sense electrode since otherwise an equal and opposite charge would flow into/out of the sense channel during positive and negative going edges, thus leading to no net transfer or charge into the charge detector. Following the desired number of cycles, the sampling switch 401 is held at position 0 while the voltage on the charge integrator 402 is measured by a measurement means 407, which may comprise an amplifier, ADC or other circuitry as may be appropriate to the application at hand. After the measurement is taken, the reset switch 404 is closed again, and the cycle is restarted, though with the next drive channel and driven electrode in sequence replacing the drive channel 101 and driven electrode 100 schematically shown in FIG. 1C. The process of making a measurement for a given driven electrode is referred to here as being a measurement 'burst' of length 'n' where 'n' can range from 1 to any finite number. The circuit's sensitivity is directly related to 'n' and inversely to the value of the charge integrator 402.

It will be understood that the circuit element designated as 402 provides a charge integration function that may also be accomplished by other means, and that this type of circuit is not limited to the use of a ground-referenced capacitor as shown by 402. It should also be self-evident that the charge integrator 402 can be an operational amplifier based integrator to integrate the charge flowing through in the sense circuitry. Such integrators also use capacitors to store the charge. It may be noted that although integrators add circuit complexity they provide a more ideal summing-junction load for the sense currents and more dynamic range. If a slow speed integrator is employed, it may be necessary to use a separate capacitor in the position of 402 to temporarily store the charge at high speed until the integrator can absorb it in due time, but the value of such a capacitor becomes relatively non-critical compared to the value of the integration capacitor incorporated into the operational amplifier based integrator.

It can be helpful for the sampling switch 401 to connect the sense electrode of the sensor to ground when not connected to the charge integrator 402 during the changes of drive signal of the chosen polarity (in this case positive going). This is because this can create an artificial ground plane, thus reducing RF emissions, and also, as noted above, permitting the coupled charge of opposite polarity to that being sensed by the charge integrator 402 to properly dissipate and neutralize. It is also possible to use a resistor to ground on the sense electrode to accomplish the same effect between transitions of drive channels 101. As an alternative to a single-pole double-throw (SPDT) switch 401, two independent switches can be used if timed in an appropriate manner.

As described in U.S. Pat. No. 5,730,165, there are many signal processing options possible for the manipulation and determination of a detection or measurement of signal amplitude. U.S. Pat. No. 5,730,165 also describes the gain relationship of the arrangement depicted in FIG. 1C, albeit in terms of a single electrode system. The gain relationship in the present case is the same. The utility of a signal cancellation means 405 is described in U.S. Pat. No. 4,879,461, as well as in U.S. Pat. No. 5,730,165. The disclosure of U.S. Pat. No. 4,879,461 is herein incorporated by reference. The purpose of signal cancellation is to reduce the voltage (i.e. charge) build-up on the charge integrator 402 concurrently with the generation of each burst (positive going transition of the drive channel), so as to permit a higher coupling between the driven electrodes and the receiving sense electrodes. One benefit of this approach is to allow a large sensing area that is sensitive to small deviations in coupling between the electrodes at relatively low cost. Such large sense couplings are present in physically relatively large electrodes such as might be used in human touch sensing pads. Charge cancellation permits measurement of the amount of coupling with greater linearity, because linearity is dependent on the ability of the coupled charge from the driven electrode 100 to the sense electrode 104 to be sunk into a 'virtual ground' node over the course of a burst. If the voltage on the charge integrator 402 were allowed to rise appreciably during the course of a burst, the voltage would rise in inverse exponential fashion. This exponential component has a deleterious effect on linearity and hence on available dynamic range.

The drive channel may be a simple CMOS logic gate powered from a conventionally regulated supply and controlled by the sensor controller 20 to provide a periodic plurality of voltage pulses of a selected duration (or in a simple implementation a single transition from low-to-high or high-to-low voltage, i.e. a burst of one pulse). Alternatively, the drive channel may comprise a sinusoidal generator or generator of a cyclical voltage having another suitable waveform. A changing electric field is thus generated on the rising and failing edges of the train of voltage cycles applied to the driven electrode. The driven electrode and the sense electrode are assumed to act as opposing plates of a capacitor having a capacitance $C_E$. Because the sense electrode is capacitively coupled to the driven electrode, it receives or sinks the changing electric field generated by the driven column electrode. This results in a current flow in the sense electrode induced by the changing voltage on the driven electrode through capacitive differentiation of the changing electric fields. The current will flow towards (or from, depending on polarity) the sense channels in the sense unit 14. As noted above, the sense channel may comprise a charge measurement circuit configured to measure the flow of charge into/out of (depending on polarity) the sense channel caused by the currents induced in the sense electrode.

The capacitive differentiation occurs through the equation governing current flow through a capacitor, namely:

$$I_E = C_E \times \frac{dV}{dt}$$

where $I_E$ is the instantaneous current flowing to the sense channel S and dV/dt is the rate of change of voltage applies to the driven electrode $D_1$. The amount of charge coupled to the sense electrode (and so into/out of the sense channel S) during an edge transition is the integral of the above equation over time, i.e.

$$Q_E = C_E \times V.$$

The charge coupled on each transition, $Q_E$, is independent of the rise time of V (i.e. dV/dt) and depends only on the voltage swing at the driven electrode (which may readily be fixed) and the magnitude of the coupling capacitance $C_E$ between the driven electrode and sense electrode. Thus a determination of the charge coupled into/out of charge detector comprising the sense channel in response to changes in the drive signal applied to the driven electrode is a measure of the coupling capacitance $C_E$ between the driven electrode and the sense electrode.

The capacitance of a conventional parallel plate capacitor is almost independent of the electrical properties of the region outside of the space between the plates (at least for plates that are large in extent compared to their separation). However, for a capacitor comprising neighbouring electrodes in a plane this is not the case. This is because at least some of the electric fields connecting between the driven electrode and the sense electrode "spill" out from the substrate. This means the capacitive coupling (i.e. the magnitude of $C_E$) between the driven electrode and the sense electrode is to some extent sensitive to the electrical properties of the region in the vicinity of the electrodes in to which the "spilled" electric field extends.

In the absence of any adjacent objects, the magnitude of $C_E$ is determined primarily by the geometry of the electrodes, and the thickness and dielectric constant of the sensor substrate. However, if an object is present in the region into which the electric field spills outside of the substrate, the electric field in this region may be modified by the electrical properties of the object. This causes the capacitive coupling between the electrodes to change, and thus the measured charge coupled into/from the charge detector comprising the sense channel(s) changes. For example, if a user places a finger in the region of space occupied by some of the of the spilled electric fields, the capacitive coupling of charge between the electrodes will be reduced because the user will have a substantial capacitance to ground (or other nearby structures whose path will complete to the ground reference potential of the circuitry controlling the sense elements). This reduced coupling occurs because the spilled electric field which is normally coupled between the driven electrode and sense electrode is in part diverted away from the electrode to earth. This is because the object adjacent the sensor acts to shunt electric fields away from the direct coupling between the electrodes.

Thus, by monitoring the amount of charge coupled between the driven electrode and the sense electrode, changes in the amount of charge coupled between them can be identified and used to determine if an object is adjacent the sensor (i.e. whether the electrical properties of the region into which the spilled electric fields extend have changed).

The two-dimensional position sensor or touch screen sensor of the invention therefore relies on active capacitive sensing techniques as opposed to passive capacitive sensing techniques which provides for a more optimal determination of position of an object, greater linearity of output signal as an object moves over the sensor, and greater sensitivity of the sensor to capacitive changes caused by an approaching object. In addition, as previously described, the sensor of the invention is more versatile and less affected by ground loading compared to known sensors.

As previously described, the sensor of the invention operates on matrix sensing principles described in U.S. Pat. No. 6,452,514. Such matrix sensing involves capacitive field changes between two electrodes, a drive electrode and a sense electrode, rather than determination of a change in capacitance from a sensing electrode to a reference potential (e.g. ground). Such matrix sensing in the touch screen sensor of the invention involves capacitive e-fields which are more "closed" compared to capacitive e-fields in passive sensors which are typically more "open". This improves the capacitive sensitivity of the sensor.

Figure 1E:
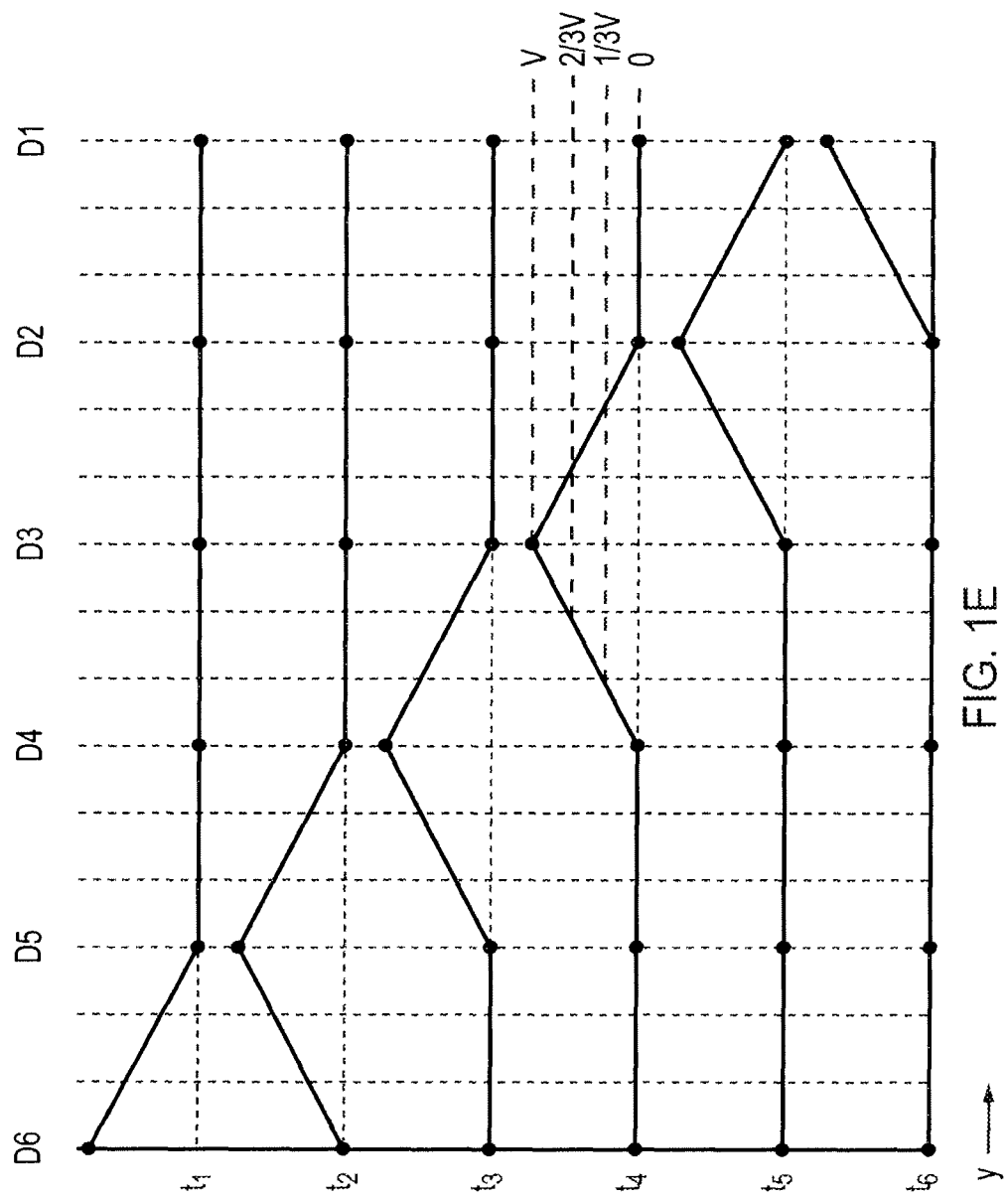
FIG. 1E shows schematically the drive signal timings suitable for use with the position sensor of FIG. 1.
Figure 2:
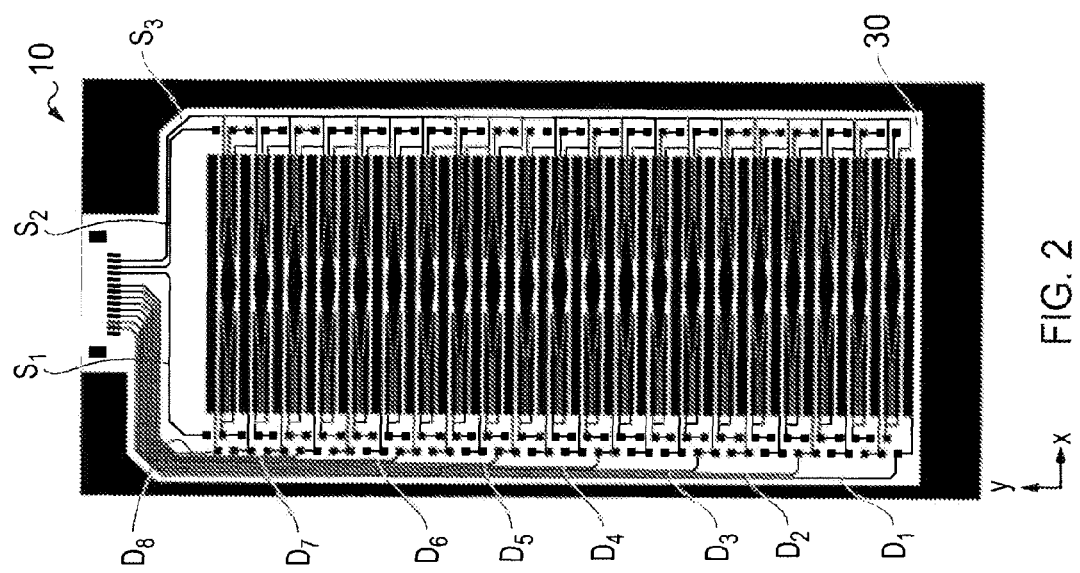
FIGS. 2 to 12 show further electrode patterns for position sensors embodying the invention.
Figure 3:
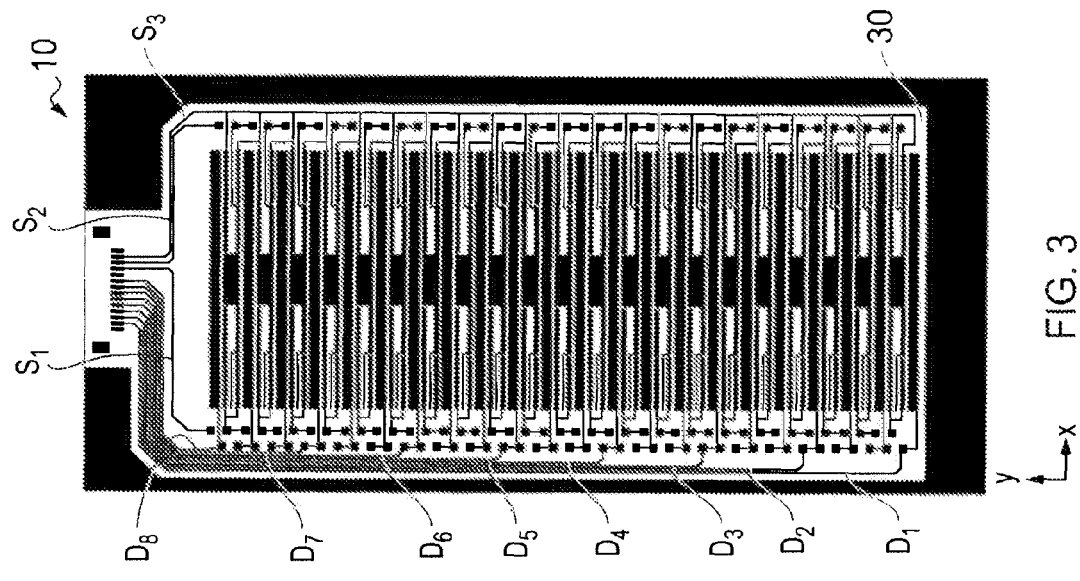
Figure 4:
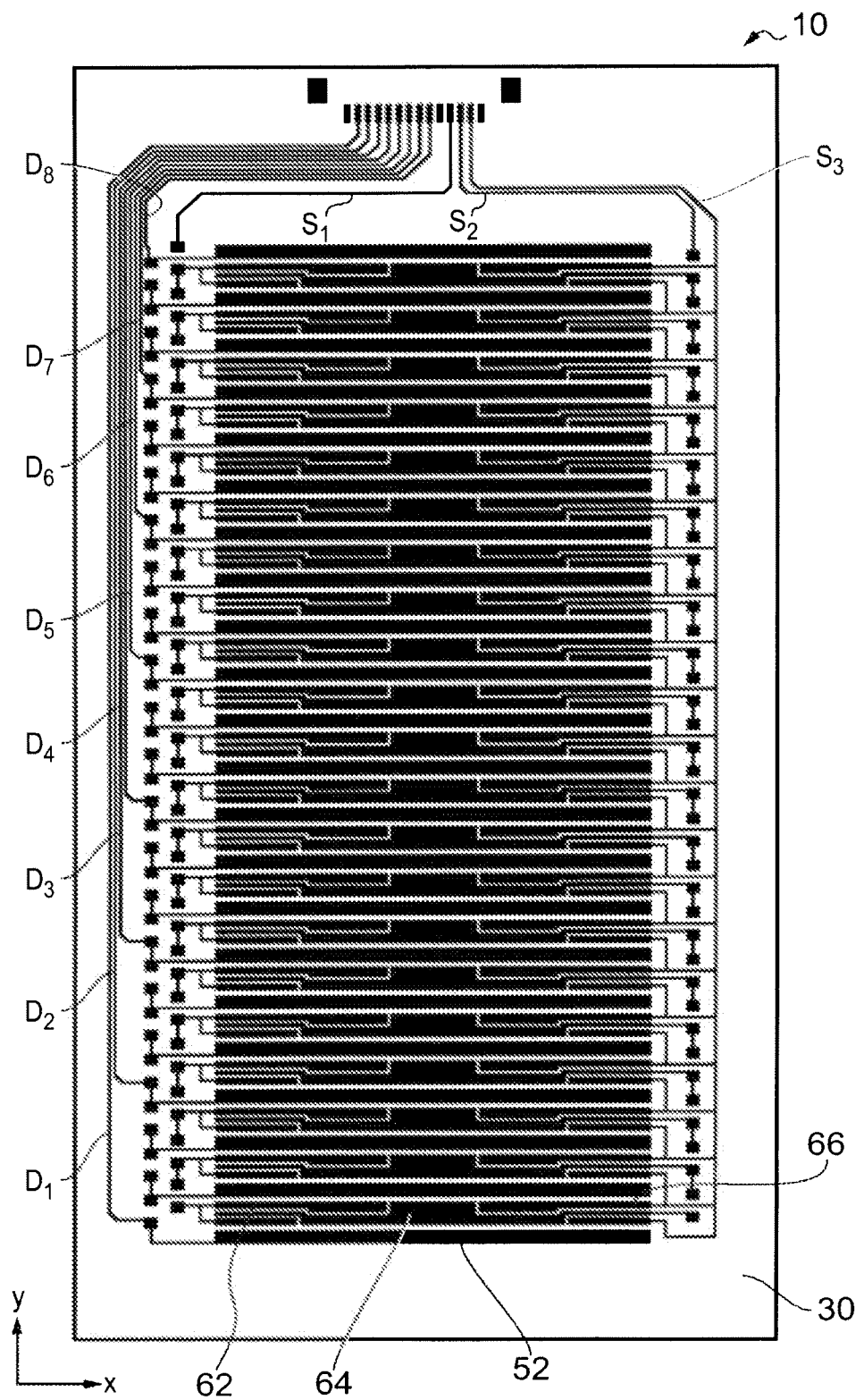
Figure 5:
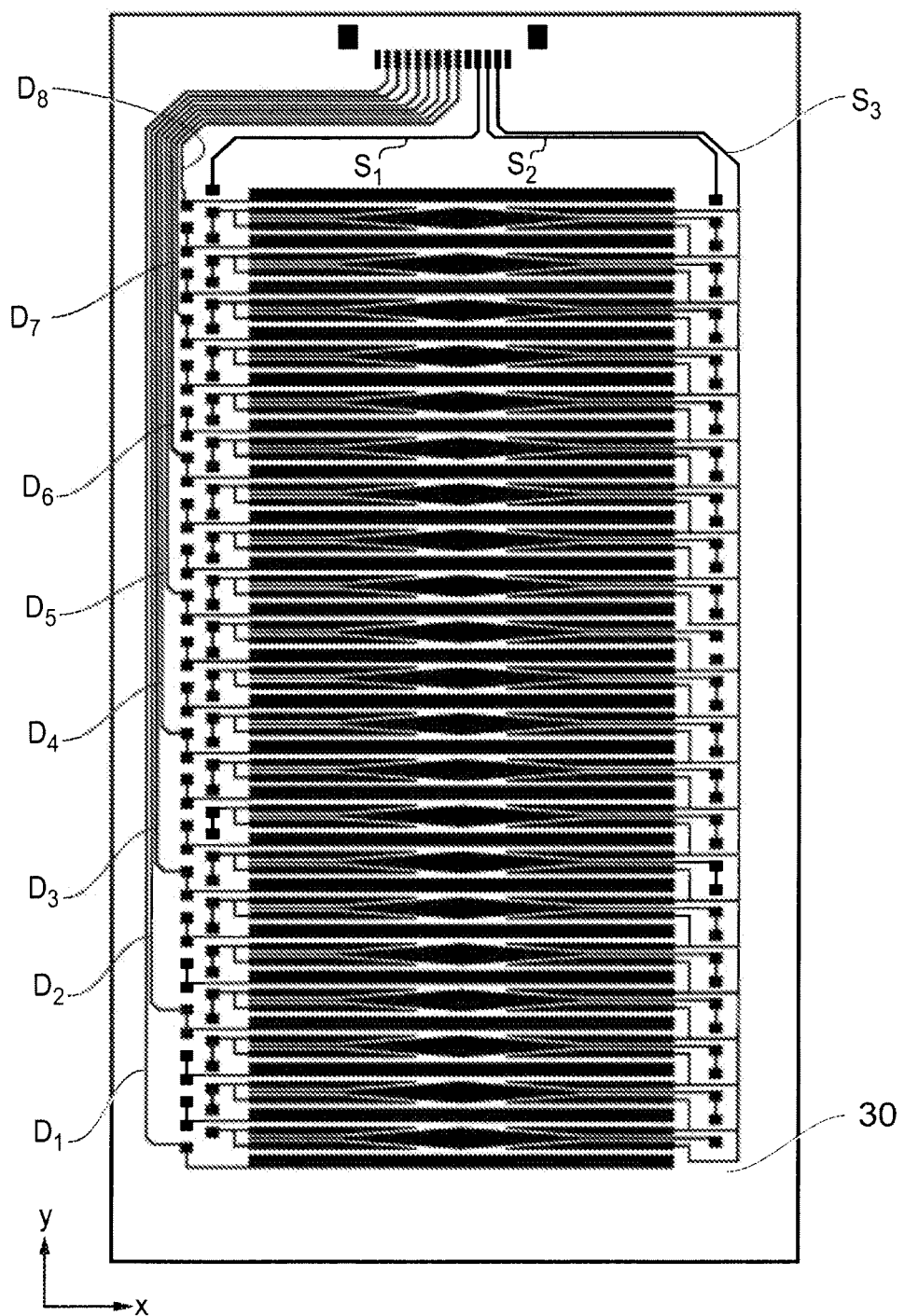
Figure 6:
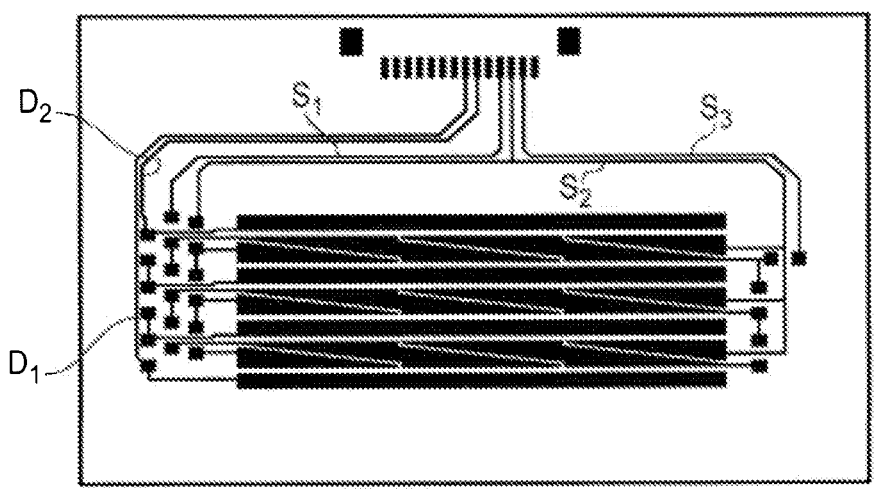
Figure 7:
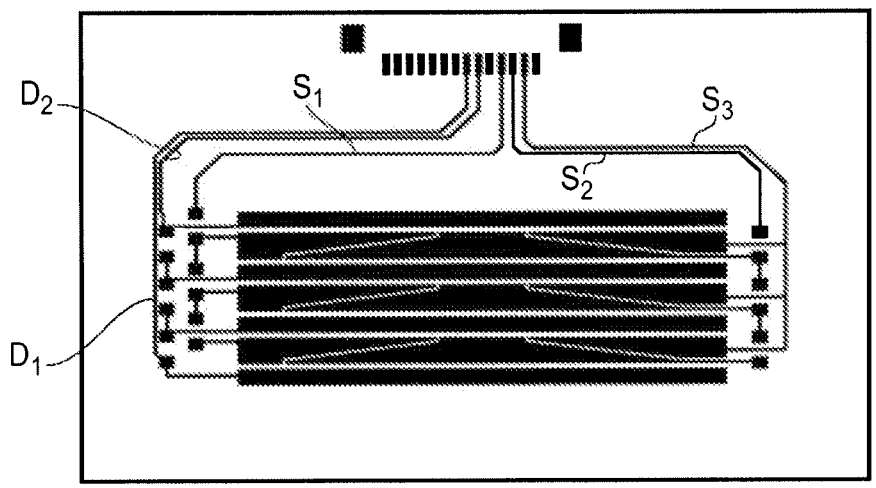
Figure 8:
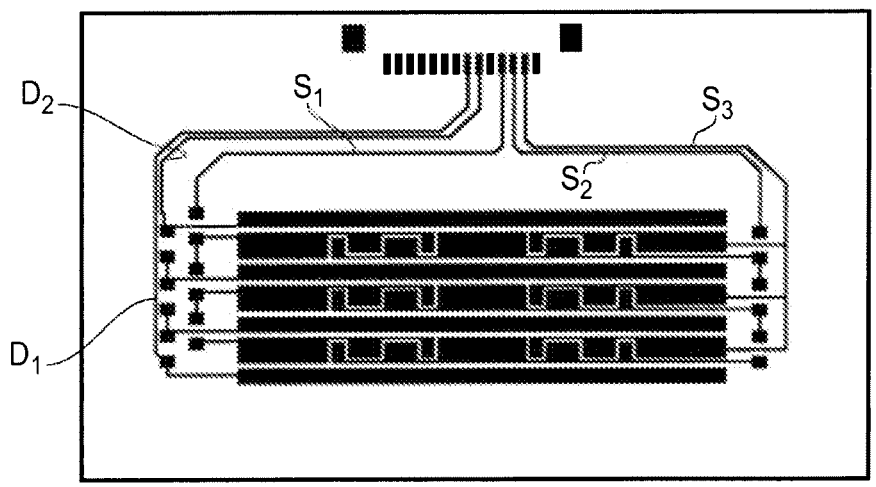
Figure 9:
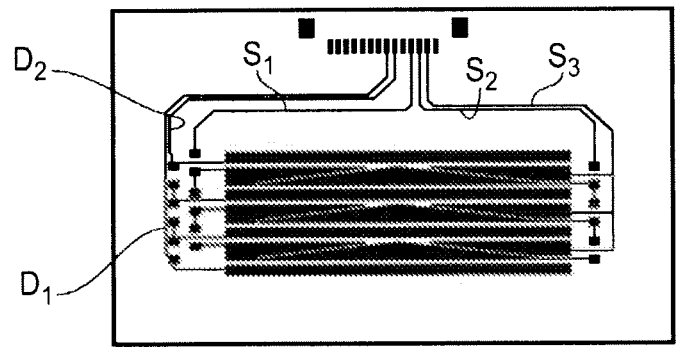
Figure 10:
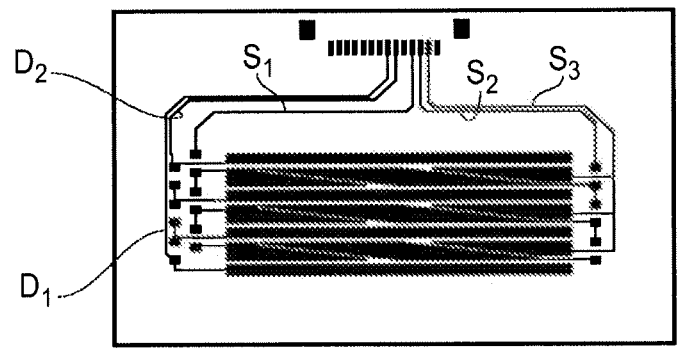

FIG. 1E shows schematically the drive signal timings suitable for use with the device of the type shown in FIGS. 1, 1A and 1B. The example drive signals assume the device has six drive channels $D_1$-$D_6$ with each drive channel connecting to every fourth drive electrode 52, thereby leaving two drive electrodes between adjacent drive channel connections, the drive electrodes being connected by a resistive ladder as previously described. The full sensitive area of the device is sampled by a sequence of six drive signals, one for each drive channel. In the illustration, it is assumed that at time t1 a drive voltage V is applied to channel $D_1$ with the other channels held at ground. Then at times t2, t3, t4, t5 and t6 the channels $D_2$ to $D_6$ respectively are driven with the same drive voltage V while the other channels are held at ground. It will be appreciated that the order of driving is not material, only that a full set of signal data is collected by driving each of the drive channels. Moreover, the drive voltages are all conveniently the same, but this is also not material. Further, the same effect would be achieved by inverting the illustrated voltages. By virtue of the chain of resistances, e.g. formed by discrete resistors or a thin film resistive strip, between adjacent drive electrodes, when a given channel is driven with a voltage pulse of magnitude V while the other channels are grounded, a voltage is dropped from V to zero from the drive electrode connected to the driven channel through to the nearest grounded drive channel or channels. In the illustrated example, the voltage is dropped in thirds, since there are two intermediate drive electrodes. If there were three intermediate drive electrodes the voltage would be dropped in quarters and so forth.

The x position of the touch or other actuation is obtained by ratiometric interpolation of the signal strength of the two groups of the three groups of sense electrodes $S_1$, $S_2$, $S_3$ that have the two strongest signals.

The y position of the touch or other actuation is also obtained by ratiometric interpolation of the signal strength, but in a somewhat different way. Once the full set of 6 signals is collected from the six drive events at t1-t6, the two adjacent events that yielded the strongest signals are selected, and the y position determined by ratiometric interpolation of the signal strength of these two signals. For example, if the strongest pair of adjacent signals is obtained from the driving of channels $D_2$ and $D_3$, and the signal obtained when driving $D_2$ is two times greater than the signal obtained when driving $D_3$, then the touch is determined to have taken place ⅓ of the way from the $D_2$ drive electrode towards the $D_3$ drive electrode.

FIGS. 2, 3, 4 and 5 show further electrode patterns embodying the invention which can be applied to a substrate incorporated in a capacitive position sensor. The electrode patterns are similar to the pattern of FIG. 1 and identical reference numerals are used to denote the same features. The bar electrodes 52 are drive (D) electrodes and the sense (S) electrodes 62, 64, 66 are arranged in three groups. It will be noted in FIG. 2 that the electrode pattern comprises first and second groups of sense electrodes 62, 64 which are tapered and co-extend together in the x-direction in one portion of extent in the x-direction, and the second and third groups of sense electrodes 64, 66 are tapered and co-extend together in another portion of extent in the x-direction. The electrode patterns illustrated in FIGS. 1 to 5 are actual size. The arrangement of sensor electrodes is important to optimise interaction of E-fields between the different groups of sensor electrodes and hence to determine object position accurately. The arrangement of the groups of sensor electrodes makes it possible for the sensor of the invention to interpret and determine the position of more than one object approaching the sensor at the same time. It is possible for the sensor to recognise simultaneous touches in two different locations on the sense electrodes on separate parts of the sensor provided that the two locations are separated in the y-direction by at least one, preferably two, drive channels. Otherwise, the interpolation carried out in the processing unit will conclude that a single touch has taken place at a location between the two simultaneous touches.

FIGS. 6 to 12 illustrate further electrode patterns embodying the invention. Each sensor has two drive channels $D_1$, $D_2$ and three sense channels $S_1$, $S_2$, $S_3$. Each drive channel supplies drive signals to two drive electrodes 52. The patterns illustrated in FIGS. 6 to 12 are actual size. All of the sensors comprise three groups of sense electrodes, except for the sensor of FIG. 6 which comprises four groups of sense electrodes.

The sensors of the invention may comprise more than three or four groups of sense electrodes depending on the design of the sensor. Five or more groups of sense electrodes may be present for example if the width of the electrode pattern is increased in the x-direction to accommodate a larger-size capacitive sensor. For example, the sensors described below and illustrated in FIGS. 14, 15 and 16 each have six groups of sense electrodes, and the sensor illustrated in FIG. 13 has seven.

Figure 13:
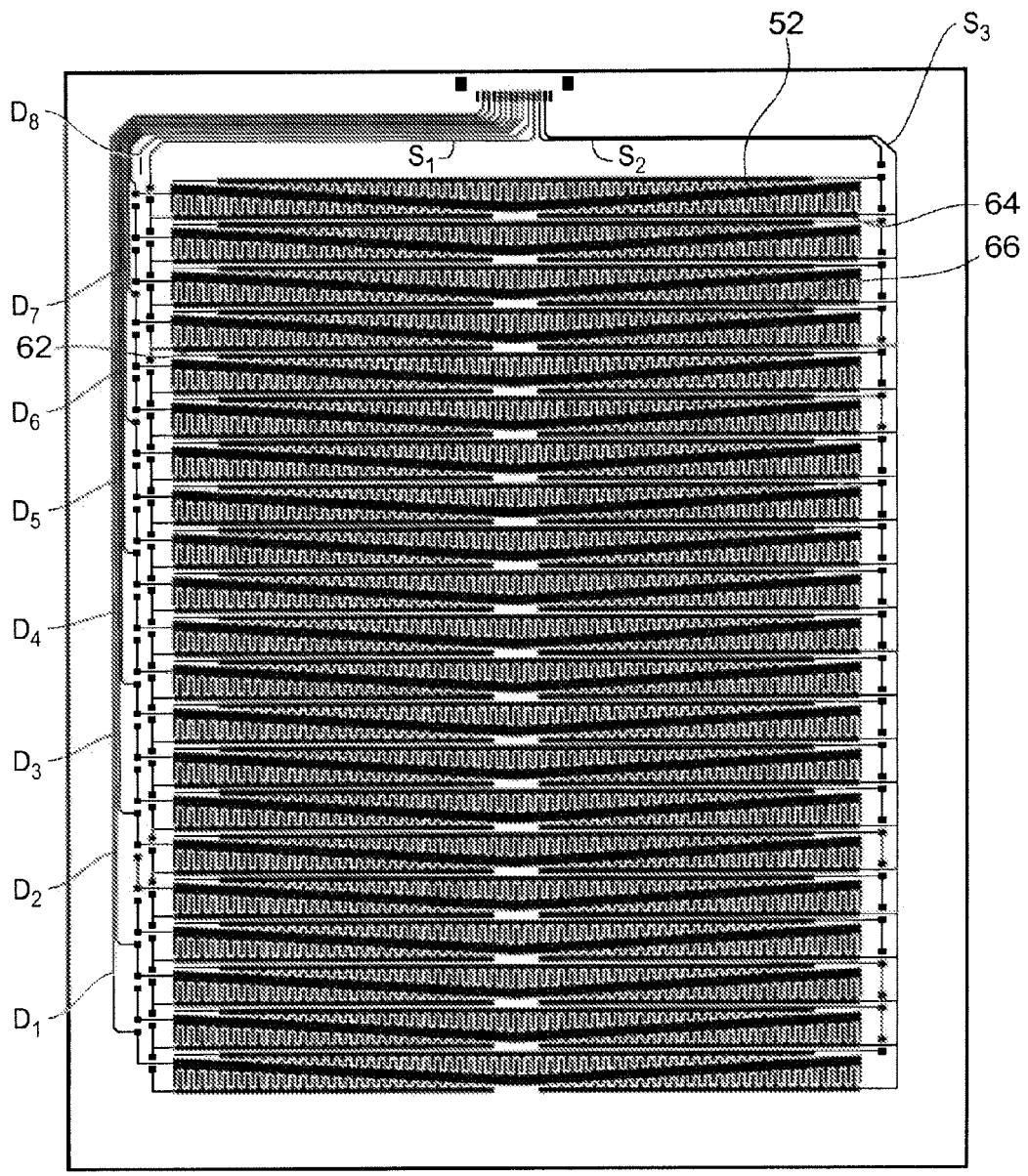
FIG. 13 shows a still further sensor embodying the invention.

FIG. 13 shows an electrode pattern according to another embodiment. The substrate bearing the electrode pattern illustrated in FIG. 13 comprises an electrode pattern of a larger size in comparison to previous embodiments. The electrode pattern of FIG. 13 has similar features and operates on the same principles as described in relation to previous embodiments. However, the drive electrodes 52 and the sense electrodes 62, 64, 66 comprise projections or teeth which interlock or interdigitate to form an intricate pattern. The drive electrodes 52 comprise teeth, bars or tines of graduating length which project into the spacings between adjacent teeth of the first, second and third groups of sense electrodes. In the electrode arrangement of FIG. 13, the first and third groups of sense electrodes 62, 66 are located on one side of the drive electrodes (i.e. below each respective drive electrode) and the second group of sense electrodes is located on the opposite side of the drive electrodes (i.e. above each respective drive electrode). Therefore, each respective drive electrode 52 is effectively "sandwiched" between the sense electrodes and comprises teeth projecting from opposite sides of each respective electrode to inter-engage with spacings between corresponding teeth of the sense electrodes. The drive electrodes 52 may be described as having a backbone which is arranged in a suitable configuration, for example a V-shaped configuration as shown. Each arm of the V-shaped electrodes are formed with teeth of graduating length on each side as previously described. The teeth of the sense electrodes also have a graduating length to engage optimally with the drive electrodes.

Figure 14:
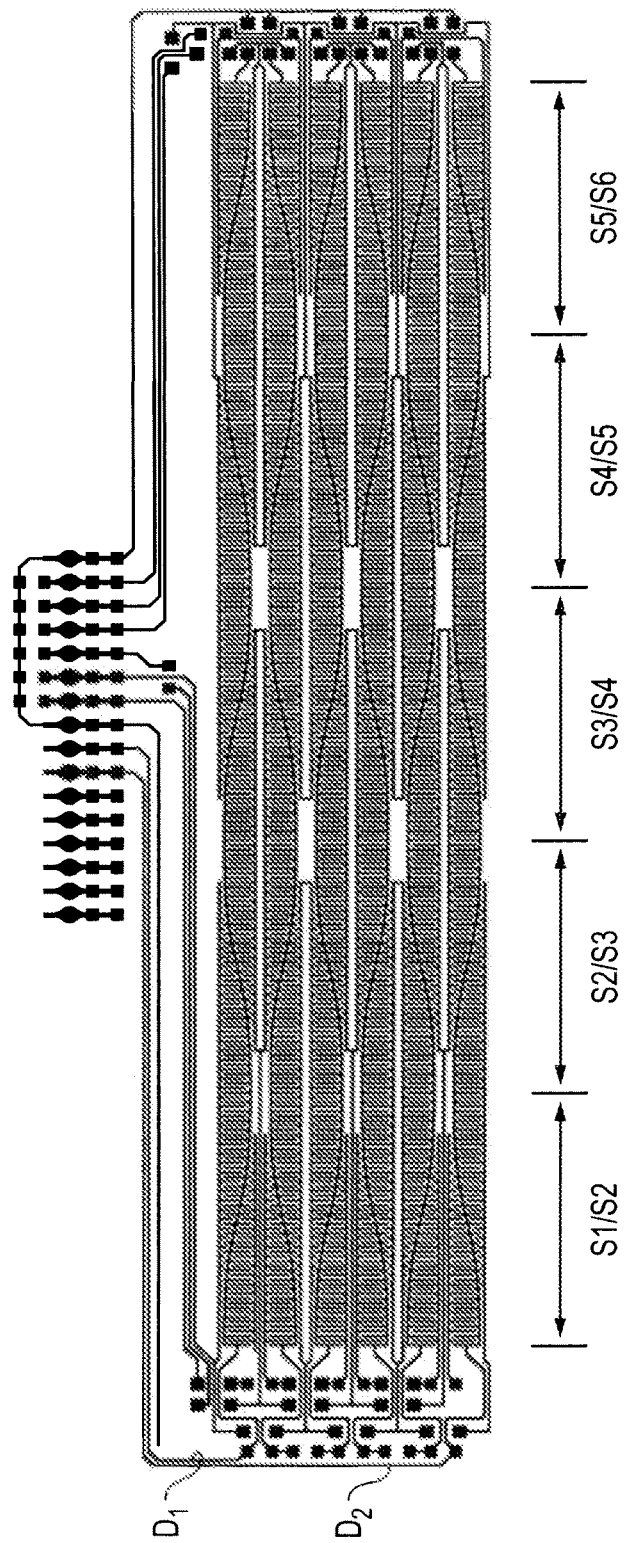
FIGS. 14, 14A and 14B show a still further embodiment of a sensor device with FIG. 14 showing the full electrode pattern, FIG. 14A only one row of the sense electrodes and FIG. 14B only the drive electrodes.
Figure 14A:
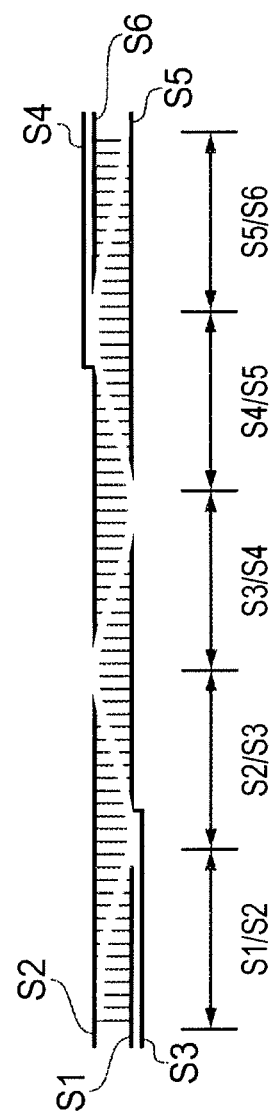
Figure 14B:
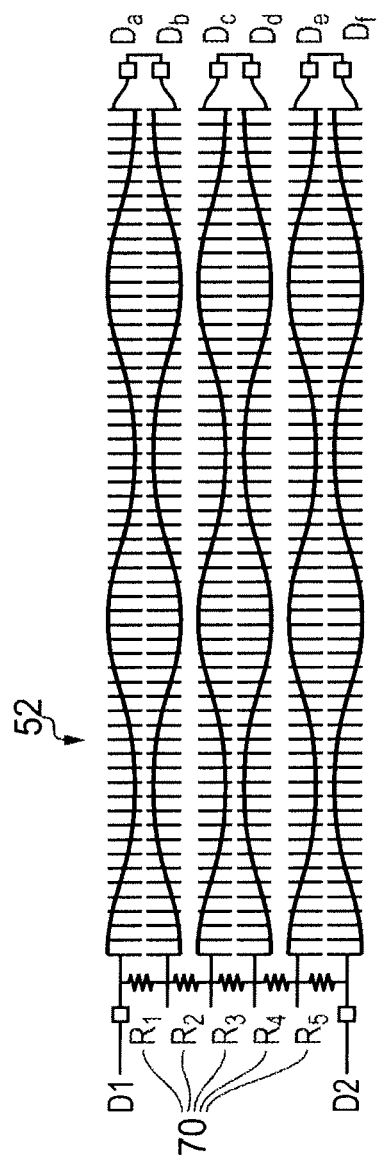

FIG. 14 shows another embodiment based on similar principles to the embodiment of FIG. 13. To separate out the detail of FIG. 14, FIG. 14A shows schematically one row of the sense electrodes $S_1$-$S_6$, namely the uppermost one, and FIG. 14B shows schematically the six drive electrode rows $D_a$ to $D_f$ which extend in the x-direction, each row being formed of a sinusoidally extending backbone or spine crossed by parallel teeth, bars or tines extending vertically, i.e. in the y-direction, with the same vertical extent as each other. Except for at peaks and troughs of the sinusoid, each tine extends through the spine having a portion above the spine and a portion below the spine. The portions above the spine interdigitate with sense electrodes $S_2$, $S_4$ and $S_6$ arranged above the spine and the portions below the spine interdigitate with sense electrodes $S_1$, $S_3$, and $S_5$ arranged below the spine. The rows of drive electrodes are arranged in a voltage ladder by means of five resistors $R_1$ to $R_5$ arranged on the left hand side of the illustrated device between the relevant pads as shown schematically in FIG. 14B. It will be understood that this device may be driven similarly to as described above in relation to the embodiment of FIG. 1, whereby each of $D_1$ and $D_2$ are driven with a drive voltage while the other one is grounded, and the y coordinate of the actuation determined by interpolation between the sense signals obtained from these two drive events. On the right hand side of the device, adjacent rows of drive electrodes are connected without a resistor, although one could be connected between each of the relevant pads shown on the right hand side of FIG. 14B if desired. Again as shown in FIG. 14B, there are two drive channels $D_1$ and $D_2$ that are connected to the uppermost and lowermost rows of drive electrodes. The sense electrodes are formed in 6 groups $S_1$-$S_6$, with groups $S_1$, $S_2$ and $S_3$ being connected from the left hand side and groups $S_4$, $S_5$ and $S_6$ from the right hand side. The groups mutually overlap to provide five ranges of sensing in the x direction that are determined by ratiometric analysis between the two greatest signals as described above in relation to the embodiment of FIG. 1. It will be understood that this design may be varied to have different numbers of groups of sense electrodes, different numbers of rows of drive electrodes, different numbers of drive channels per drive electrodes (including one) and so forth.

Figure 15:
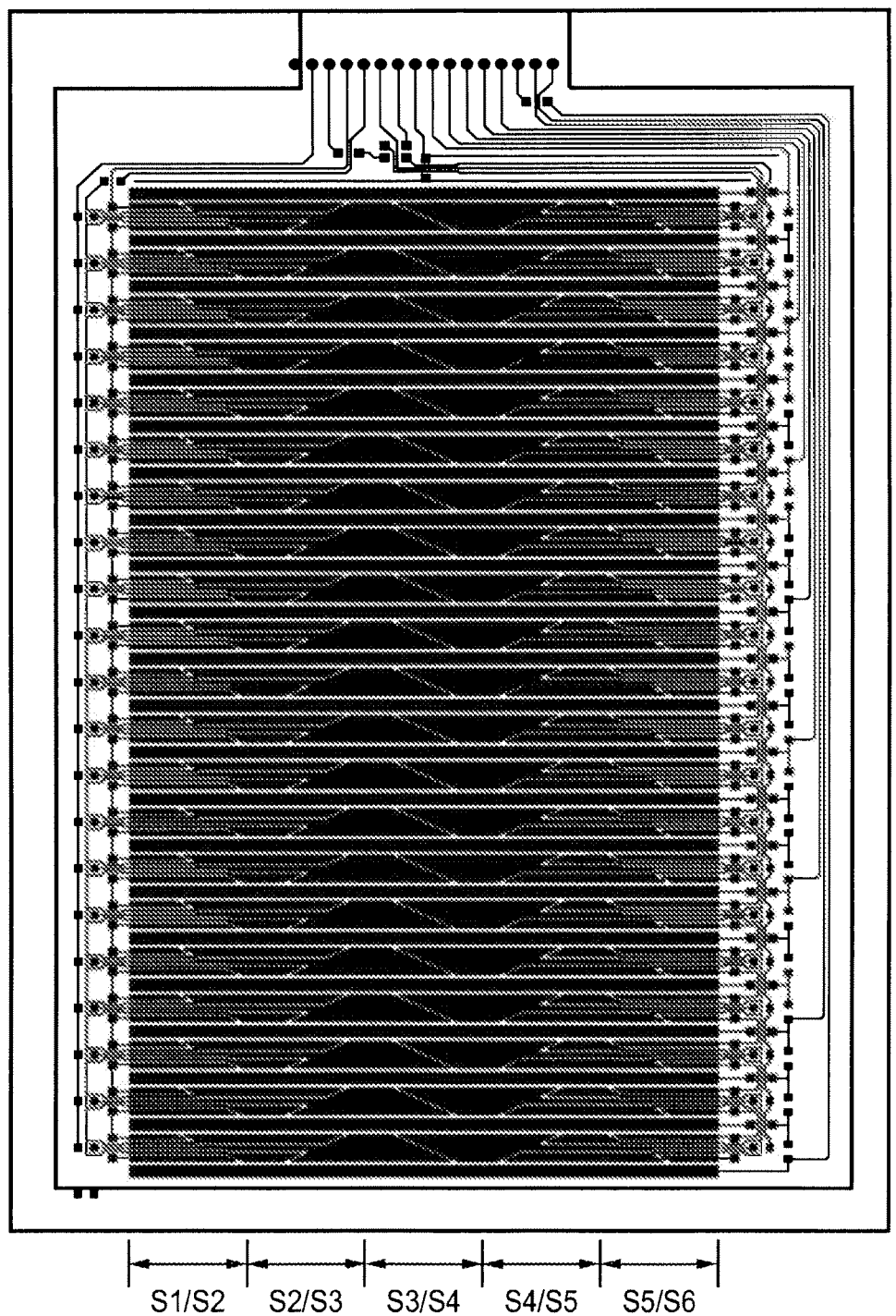
FIGS. 15 and 15A show a still further embodiment of a sensor device

FIG. 15 shows a sensor with associated electrode pattern according to a further embodiment. There are provided six sensor electrode groups $S_1$-$S_6$ which overlap in similar manner to previous embodiments in order to allow ratiometric determination of the x location of an actuation. Each row of sense electrodes is flanked above and below by a drive electrode 52. The special feature of this embodiment, not possessed by previous embodiments, is the stepwise broadening of the feed-through connections leading to the innermost sense electrode groups S3 and S4.

Figure 15A:
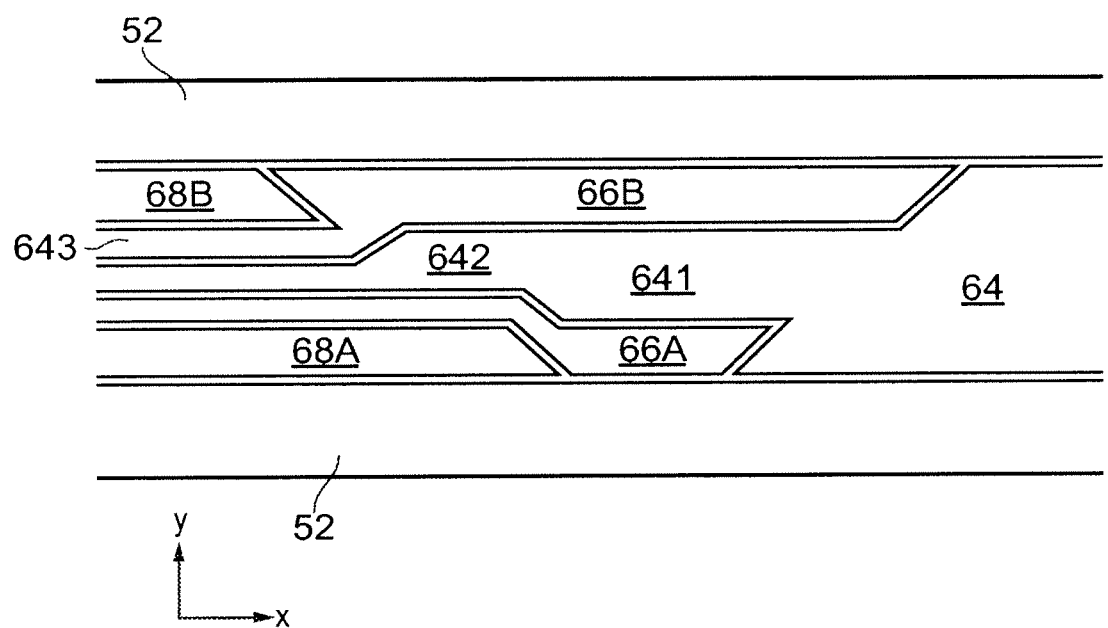

FIG. 15A illustrates this feature schematically. The feed-through for each sense electrode 64 of the group $S_3$ has three portions of incrementally increasing width (vertical dimension). The narrowest portion 643 leads from the left-most side of the sensitive area and is flanked by feed-throughs for the sense electrode 66 of the group $S_2$. Progressing in the positive x-direction, after termination of the shorter upper element 68B of the sense electrode $S_1$, the feed-through for the sense electrode 64 widens into a portion 642, and after termination of the longer lower element 68A of the sense electrode $S_1$, the feed-through widens again into a portion 643. The benefit of the progressive widening is that the resistance between the innermost sense electrodes and the sensing circuitry of the associated sense channels is reduced, thereby reducing the effect whereby the innermost sense electrodes will have less sensitivity than the outer ones.

Figure 16:
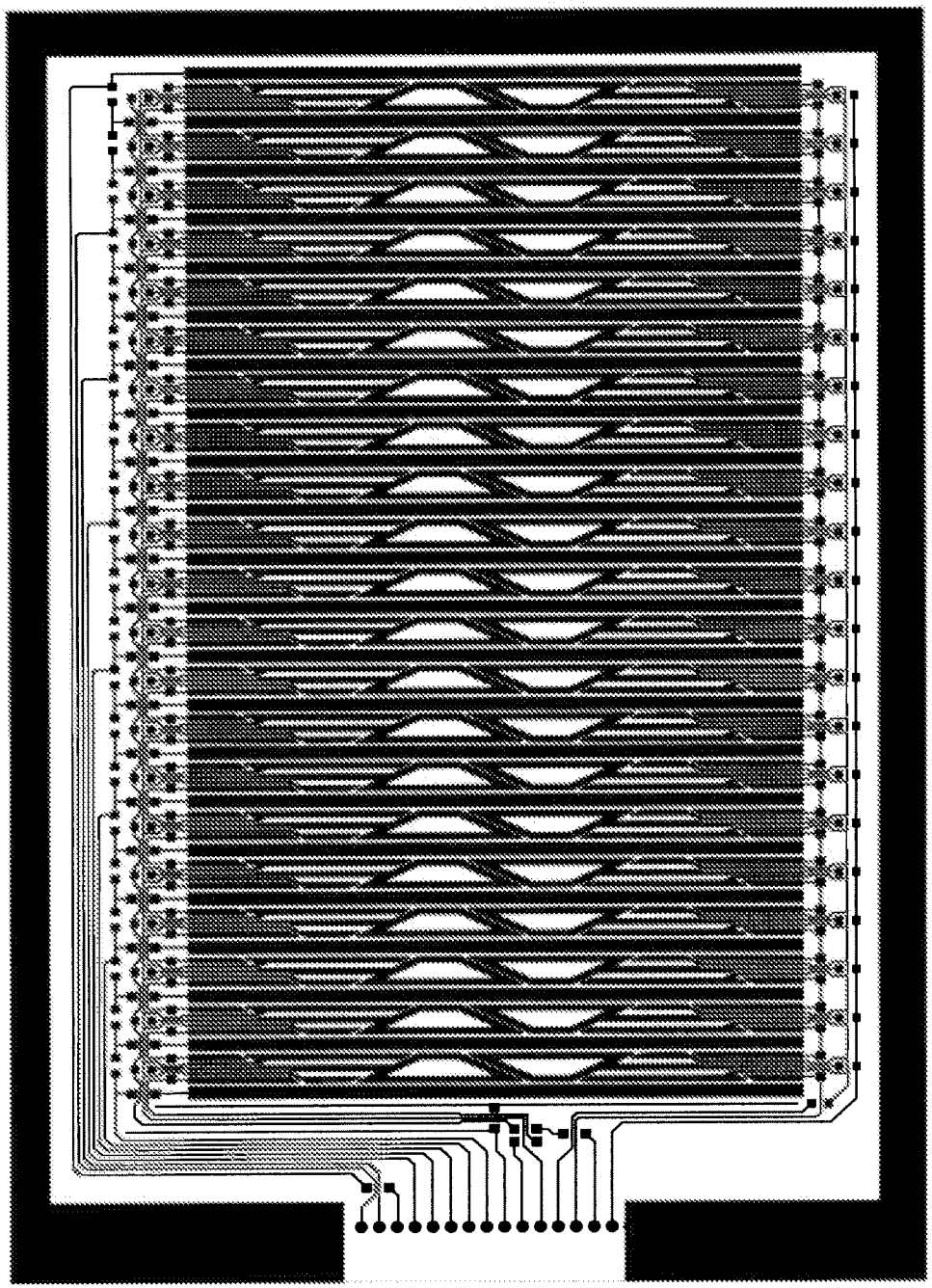
FIGS. 16 and 16A show a still further embodiment of a sensor device

FIG. 16 shows a sensor with associated electrode pattern according to a further embodiment which is the same as the embodiment of FIG. 15 except that the conductive material of the innermost sense electrodes are hollowed out.

Figure 16A:
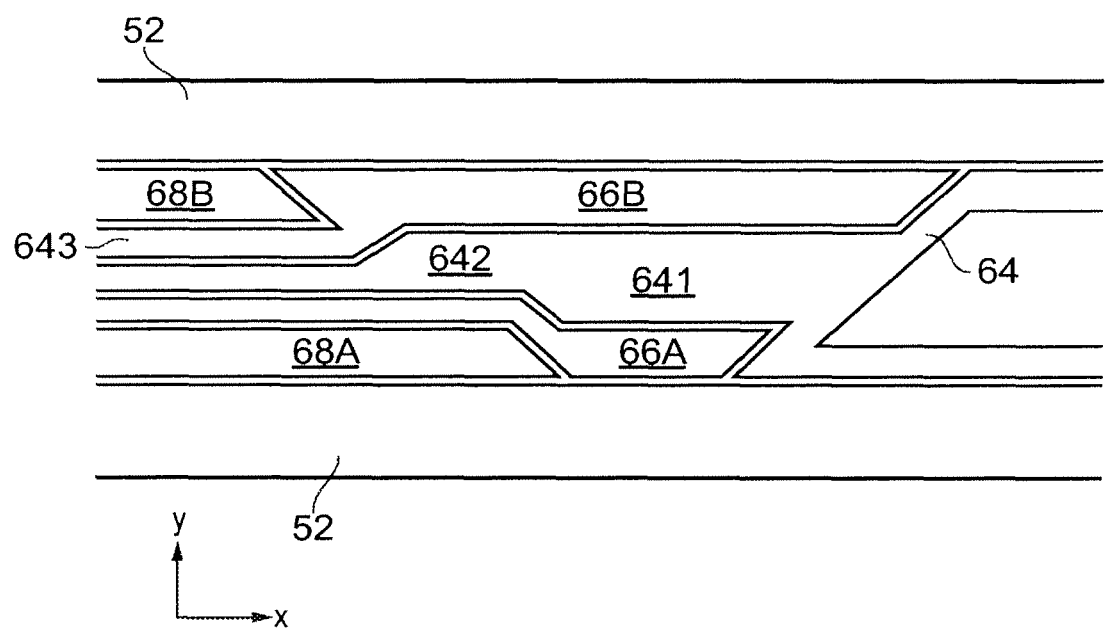

FIG. 16A illustrates this feature schematically. The illustrated sense electrode 64 of sense electrode group $S_3$ is shown hollowed out. All the sense electrodes of sense electrode groups $S_3$ and $S_4$ are similarly hollowed out as evident from FIG. 16. The advantage of this approach comes from the realisation that in the kind of active sensing using driven and sensing electrodes to which the invention relates, the signal is primarily only affected by directly proximal areas of paired drive and sense electrodes. The conductive material in the sense electrodes situated a further distance away from the associated drive electrodes does not contribute significantly to the signal and are therefore largely redundant. Furthermore, it has been established that this additional conductive material can contribute significantly to the pick-up of environmental noise. Improved signal-to-noise ratios are thus achieved with the electrode arrangement of FIG. 16 compared with that of FIG. 15 through the hollowing out of the large central sense electrodes. More rigorously, the design approach to follow is to ensure that the sense electrodes do not extend further than a given distance away from their associated drive electrodes, where the given distance is a characteristic distance indicative of the sensing depth over which the majority of signal is collected, for example at least 50, 60, 70, 80, 90 or 99% of the signal.

Figure 17:
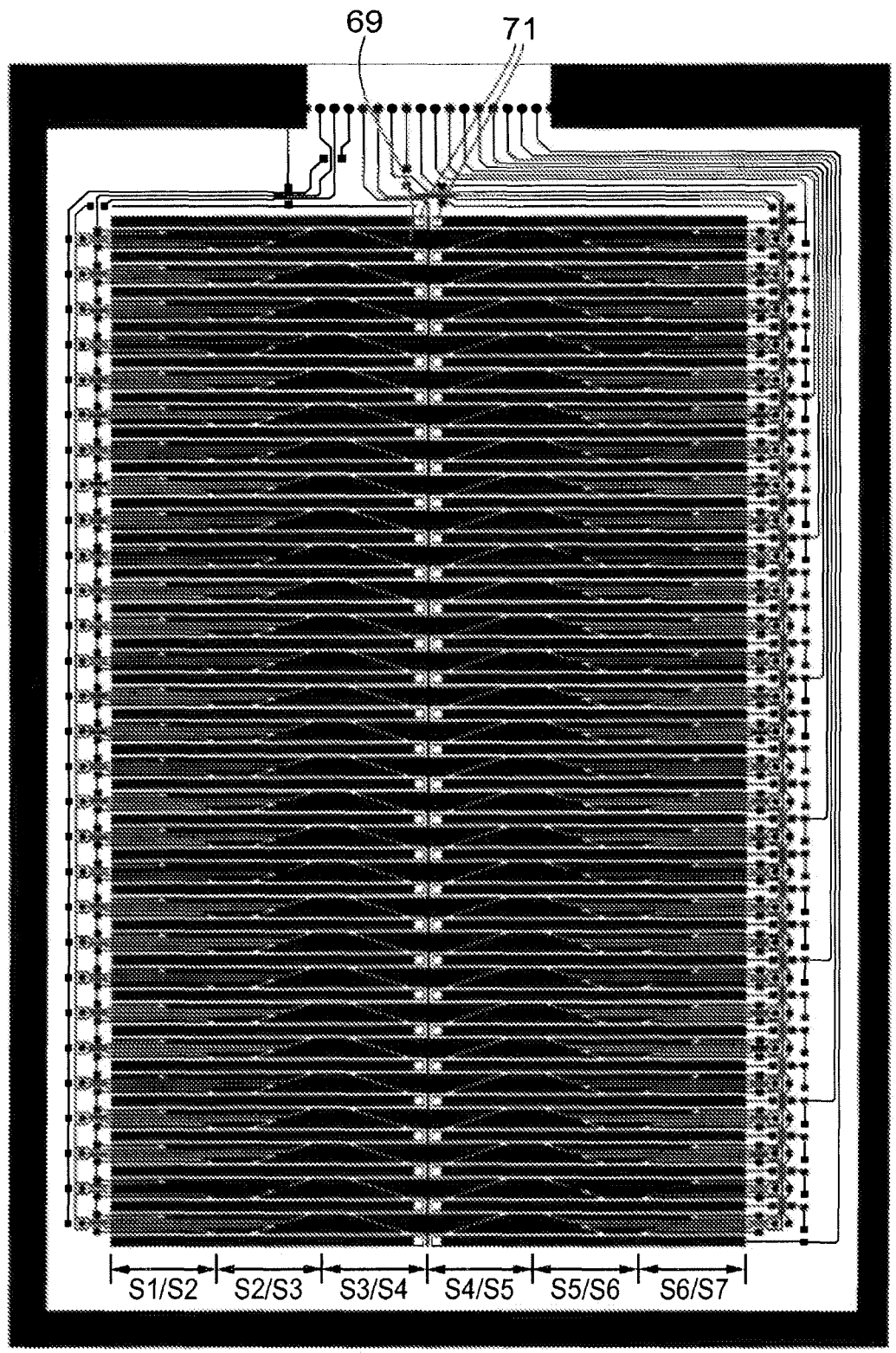

FIG. 17 shows a sensor with associated electrode pattern according to a further embodiment which can be understood with reference to the embodiment of FIG. 15. The electrode pattern is modified in comparison to the FIG. 15 embodiment in that an additional central spine is inserted to provide an additional sense electrode group of sense electrodes 69 which are vertically connected to each other and connected to the associated sense channel by the top of the device rather than the sides. In the illustrated example, discrete bridging component connections 71 connect left and right sides of the drive electrodes to bridge over the conductive path between vertically adjacent ones of the sense electrodes 69. This general approach will be understood from co-pending application 60/803,510 and its subsequent regular filing U.S. Ser. No. 11/752,615 which was published as US2006/0279395 on 6 Dec. 2007.

The electrode patterns described in co-pending U.S. Patent Application 60/803,510 and its subsequent regular filing U.S. Ser. No. 11/752,615 which was published as US2006/0279395 are incorporated herein by reference. The electrode patterns of U.S. Patent Application 60/803,510 are similar to the electrode patterns described hereinabove and such patterns can be used to measure capacitance based on active capacitive sensing techniques in accordance with the invention described above, although not optimised for such.

Figure 11:
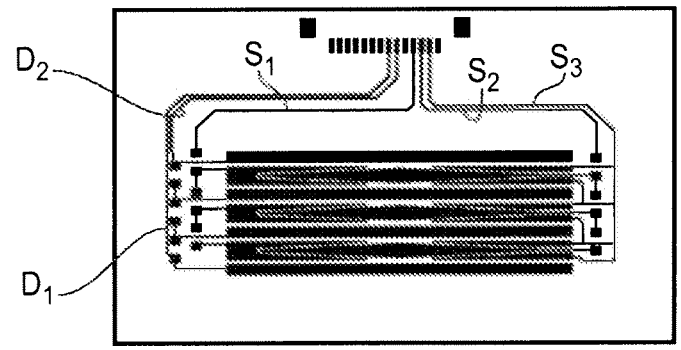
Figure 12:
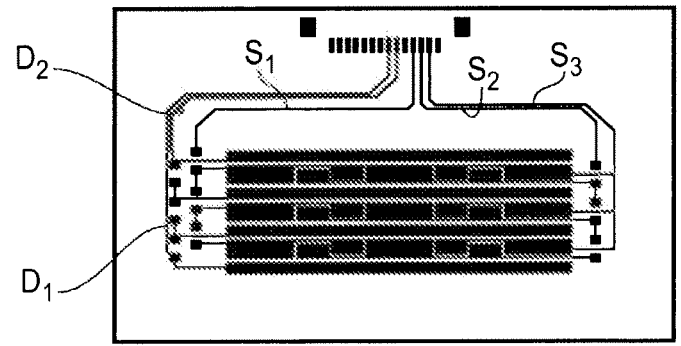

FIG. 18 illustrates a pattern of electrodes which is identical to FIG. 11 of U.S. Application 60/803,510. The electrode pattern of FIG. 18 can be applied to a substrate incorporated in a capacitive position sensor embodying the invention. The longitudinal (bar) electrodes 52 are drive (D) electrodes and the electrodes arranged in an interleaved arrangement between adjacent drive electrodes are the sense (S) electrodes. This embodiment comprises four groups of sense electrodes 62, 64, 66 and 88. The sense electrodes 62, 64, 66 can be connected by conductive traces to receive channels $S_1$, $S_2$, $S_3$. Likewise, the sense electrode 88 can be connected a receive channel $S_4$. The receive channels $S_1$, $S_2$, $S_3$, $S_4$ transmit signals from the sense electrodes to a sensing unit in a controller. Drive channels $D_x$ (not shown) send drive signals to groups of drive electrodes 52. A drive unit in a controller supplies the drive signals to respective drive electrodes or groups of drive electrodes. As described in more detail above, a position of an object on the sensor may be determined by the disruption or reduction of capacitive coupling between a drive electrode and one or more sense electrodes and processing the signals from the sense electrodes to calculate finger position. The electrode patterns illustrated in FIGS. 2, 3, 4 and 6 to 15 of U.S. application 60/803,510 are incorporated by reference herein and form part of the disclosure of this invention. The embodiments of FIGS. 2, 3, 4 and 6 to 15 of U.S. application 60/803,510 are driven and sensed using active (or matrix) capacitive sensing as described in U.S. Pat. No. 6,452,514 and give the advantages as described above.

It will be appreciated that the sensor of the invention is applicable to many types of device/appliance. For example, sensors can be used with ovens, grills, washing machines, tumble-dryers, dish-washers, microwave ovens, food blenders, bread makers, drinks machines, computers, home audio-visual equipment, personal computers, portable media players, PDAs, cell phones, computers, games consoles and so forth.

Figure 19:
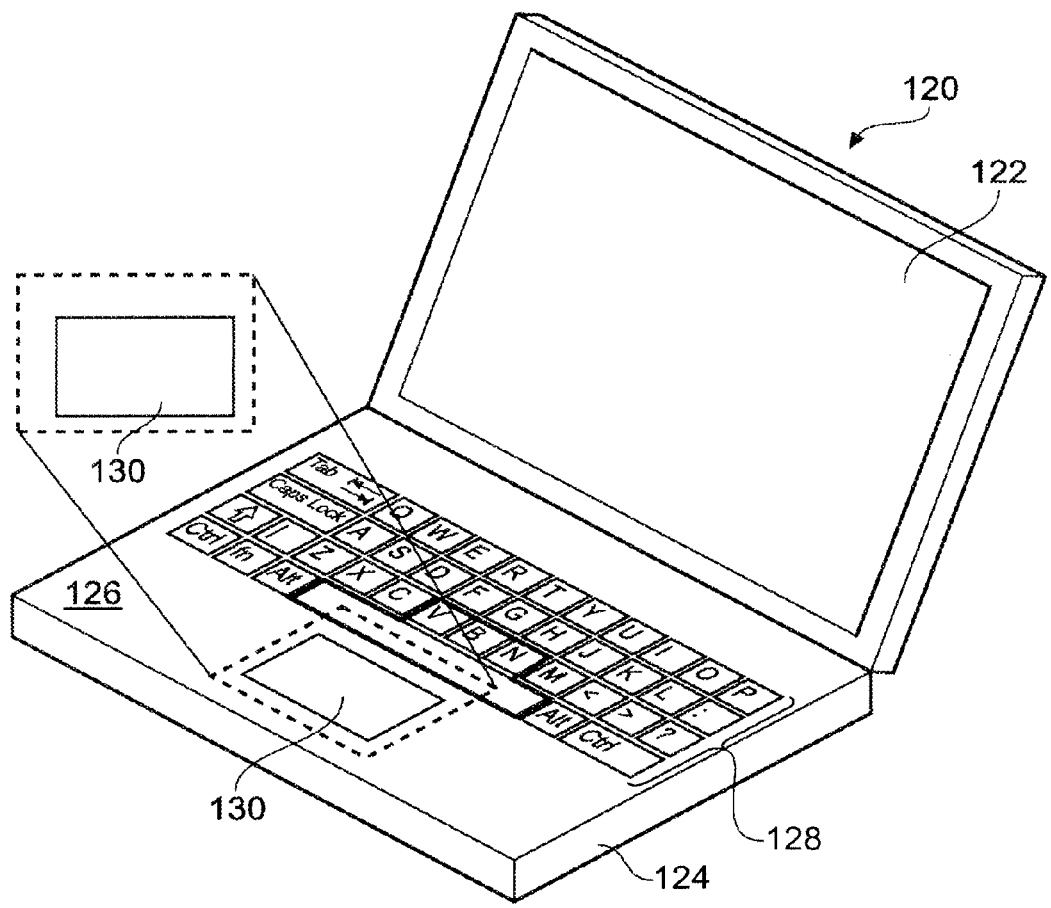
FIG. 19 schematically shows a portable personal computer incorporating a sensor according to an embodiment of the invention.

FIG. 19 shows an example of a mobile personal computer (PC) 120. A touch sensor according to the present technique could be used to form part or the whole of an input control panel of the notebook PC 120. In the figure, the PC 120 is shown, which includes a display device 122 attached to a base 124, which accommodates a processor and other components typically associated with a PC. An input control panel 126 includes a keyboard 128. The input control panel 126 further includes a touch sensitive mouse pad 130. The mouse pad can be implemented using a touch sensor according to the present invention. Moreover, the display device 122 can also be implemented with a touch sensor according to the present invention overlaid on top of it to provide a touch screen. This may be particularly useful for a tablet PC.

Figure 20:
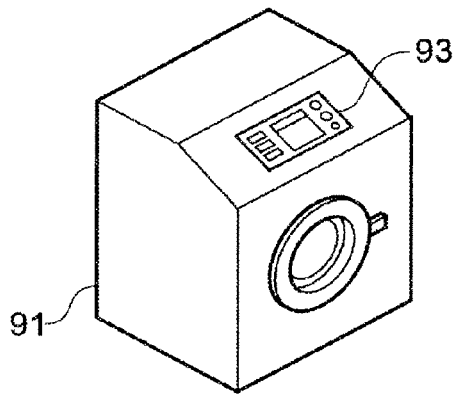
FIG. 20 schematically shows a washing machine incorporating a sensor according to an embodiment of the invention.

FIG. 20 schematically shows a washing machine 91 incorporating a control panel 93 which incorporates a sensor according to the invention.

Figure 21:
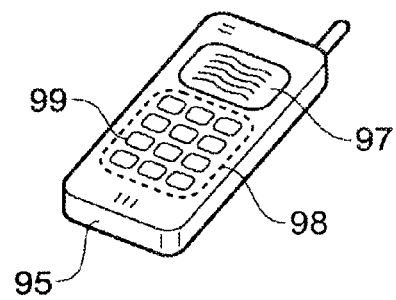
FIG. 21 schematically shows a cellular telephone incorporating a sensor according to an embodiment of the invention.

FIG. 21 schematically shows a cellular telephone 95 which may incorporate one or more sensors according to an embodiment of the invention. A two-dimensional sensor 98 according to the invention may be used to provide the button panel with buttons 99, or may be a separate sensor co-extensive with the button panel. For example, the button panel may be retained as a mechanical assembly and the sensor provided to allow drawing, writing or command gestures to be performed by the user over the button panel area, for example to compose text messages in Chinese or other Asian characters. The screen 97 may also be overlaid with a sensor according to the invention.

More generally the invention may be used in conjunction with any appliance having a human-machine interface. It is also possible to provide a sensor similar to those described above which is provided separately from a device/appliance which it may be used to control, for example to provide an upgrade to a pre-existing appliance. It is also possible to provide a generic sensor which may be configured to operate a range of different appliances. For example, a sensor may be provided that has programmable keys which a device/appliance provider may associate with desired functions by appropriately configuration, for example by reprogramming.

What is claimed is:

1. A sensor comprising:
    a substrate;
    a plurality of drive electrodes provided on the substrate;
    plurality of sense electrodes provided on the substrate, each of the sense electrodes being capacitively coupled with at least one of the drive electrodes; and
    a controller, comprising at least one drive unit and at least one sense unit, the controller configured to apply a drive signal to each of the drive electrodes and to sense signals received from the sense electrode, wherein:
        each of the plurality of sense electrodes is formed of at least three elements that cooperate to form a respective sense electrode;
        the at least three elements that cooperate to form a respective sense electrode each comprise a group of one or more element portions that form first, second, and third groups of elements; and
        a portion of the first and second groups of elements co-extend in a first direction over a first area of the substrate and the second and third groups of elements co-extend in the first direction over a second area of the substrate.

2. The sensor of claim 1, wherein the controller further comprises a processing unit configured to calculate a position of an interaction with the sensor from an analysis of the sense signals obtained by applying the drive signal to the drive electrode.

3. The sensor of claim 1, wherein each of the at least three elements that cooperate to form a respective sense electrode are separated by a channel.

4. The sensor of claim 1, wherein the group of sense electrodes which co-extend have complementary tapers over their distance of co-extension to provide ratiometric capacitive signals.

5. The sensor of claim 1, wherein the elements of respective groups of sense electrodes which co-extend have adjacent blocks of varying area over their distance of co-extension to provide ratiometric capacitive signals.

6. The sensor of claim 1, wherein drive and sense electrodes interdigitate.

7. The sensor of claim 1, wherein the at least three elements that cooperate to form a respective sense electrode is hollow in a plane substantially parallel to a surface of the substrate.

8. The sensor of claim 1, wherein the elements of adjacent sense electrodes are complimentary in shape and separated by a channel.

9. An electronic device, comprising:
    a housing;
    a touch-sensitive sensor disposed within the housing, the touch-sensitive sensor comprising: a substrate;
    a plurality of drive electrodes provided on the substrate;
    plurality of sense electrodes provided on the substrate, each of the sense electrodes being capacitively coupled with at least one of the drive electrodes, wherein each of the plurality of sense electrodes is formed of at least three elements that cooperate to form a respective sense electrode, the at least three elements that cooperate to form a respective sense electrode each comprising a group of one or more element portions that form first, second, and third groups of elements, a portion of the first and second groups of elements co-extending in a first direction over a first area of the substrate and the second and third groups of elements co-extending in the first direction over a second area of the substrate; and
    a controller, comprising at least one drive unit and at least one sense unit, the controller configured to apply a drive signal to each of the drive electrodes and to sense signals received from the sense electrodes.

10. The electronic device of claim 9, wherein the controller further comprises a processing unit configured to calculate a position of an interaction with the sensor from an analysis of the sense signals obtained by applying the drive signal to the drive electrode.

11. The electronic device of claim 9, wherein each of the at least three elements that cooperate to form a respective sense electrode are separated by a channel.

12. The electronic device of claim 9, wherein the group of sense electrodes which co-extend have complementary tapers over their distance of co-extension to provide ratiometric capacitive signals.

13. The electronic device of claim 9, wherein the elements of respective groups of sense electrodes which co-extend have adjacent blocks of varying area over their distance of co-extension to provide ratiometric capacitive signals.

14. The electronic device of claim 9, wherein drive and sense electrodes interdigitate.

15. The electronic device of claim 9, wherein the at least three elements that cooperate to form a respective sense electrode is hollow in a plane substantially parallel to a surface of the substrate.

16. The electronic device of claim 9, wherein the elements of adjacent sense electrodes are complimentary in shape and separated by a channel.

17. A circuit comprising:
    a drive unit operable to apply drive signals to a plurality of drive electrodes provided on a substrate, a plurality of sense electrodes provided on the substrate, each of the sense electrodes capacitively coupled with at least one of the drive electrodes, wherein each of the plurality of sense electrodes is formed of at least three elements that cooperate to form a respective sense electrode, the at least three elements that cooperate to form a respective sense electrode each comprising a group of one or more element portions that form first, second, and third groups of elements, a portion of the first and second groups of elements co-extending in a first direction over a first area of the substrate and the second and third groups of elements co-extending in the first direction over a second area of the substrate; and
    a sense unit operable to measure sense signals received from each group of the sense electrodes representing a degree of capacitive coupling of the drive signals between the drive electrodes and each group of the sense electrodes;
    the circuit operable to:

determine first position by an interpolation between sense signals obtained from co-extending pairs of groups of sense electrodes; and determine second position by an interpolation between sense signals obtained by sequentially driving the plurality of drive electrodes with respective drive signals.

18. The circuit of claim 17, wherein the group of sense electrodes which co-extend have complementary tapers over their distance of co-extension to provide ratiometric capacitive signals.

19. The circuit of claim 17, wherein the elements of respective groups of sense electrodes which co-extend have adjacent blocks of varying area over their distance of co-extension to provide ratiometric capacitive signals.

20. The circuit of claim 17, wherein the elements of adjacent sense electrodes are complimentary in shape and separated by a channel.

* * * * *